(12) United States Patent
Bennett

(10) Patent No.: US 7,893,999 B2
(45) Date of Patent: Feb. 22, 2011

(54) SIMULTANEOUS VIDEO AND SUB-FRAME METADATA CAPTURE SYSTEM

(75) Inventor: James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 689 days.

(21) Appl. No.: 11/491,019

(22) Filed: Jul. 20, 2006

(65) Prior Publication Data

US 2008/0018784 A1     Jan. 24, 2008

Related U.S. Application Data

(63) Continuation-in-part of application No. 11/474,032, filed on Jun. 23, 2006.

(60) Provisional application No. 60/802,423, filed on May 22, 2006.

(51) Int. Cl.
    *H04N 9/74*     (2006.01)
    *H04N 7/26*     (2006.01)

(52) U.S. Cl. ...................... 348/578; 386/124

(58) Field of Classification Search .............. 348/439.1, 348/564, 565, 578, 584, 589, 14.08, 14.11, 348/143, 211.12; 386/95, 124–126
See application file for complete search history.

(56) References Cited

U.S. PATENT DOCUMENTS

| | | | |
|---|---|---|---|
| 5,568,200 A * | 10/1996 | Pearlstein et al. | 375/240.27 |
| 6,282,362 B1 * | 8/2001 | Murphy et al. | 386/46 |
| 7,325,033 B2 * | 1/2008 | Thornton | 709/204 |
| 7,350,224 B2 * | 3/2008 | Creamer et al. | 725/105 |
| 7,362,349 B2 * | 4/2008 | Nelson et al. | 348/14.08 |
| 7,428,000 B2 * | 9/2008 | Cutler et al. | 348/14.11 |

(Continued)

FOREIGN PATENT DOCUMENTS

CN     03135673 A     6/1991

(Continued)

OTHER PUBLICATIONS

Askelof J, et al, "Metadata-driven multimedia access", IEEE Signal Processing Magazine, IEEE Service Center, Mar. 1, 2003, vol. 20, No. 2, pp. 40-52, Piscataway, NJ.

(Continued)

*Primary Examiner*—Lin Ye
*Assistant Examiner*—Trung Diep
(74) *Attorney, Agent, or Firm*—Garlick Harrison & Markison; Bruce E. Garlick

(57) ABSTRACT

A video processing system captures a sequence of original video frames with a video camera, presents at least one frame of the sequence of original video frames on a video display, receives user input regarding the sequence of original video frames, and presents a sub-frame on the video display that corresponds to a region in at least one frame of the sequence of original video frames that is identified in the user input. The video processing system also generates metadata corresponding to the sub-frame, the metadata to be used by a target video player in modifying the sequence of original video frames to produce a full screen presentation on a target video display of the target video player corresponding to the sub-frame. Targeted sub-frame metadata can be specifically generated for use with a particular screen or screen size.

19 Claims, 15 Drawing Sheets

U.S. PATENT DOCUMENTS

| | | | |
|---|---|---|---|
| 7,428,008 B2 * | 9/2008 | Okamoto et al. | 348/222.1 |
| 7,428,019 B2 * | 9/2008 | Irani et al. | 348/581 |
| 2002/0092029 A1 | 7/2002 | Smith | |
| 2002/0154127 A1 * | 10/2002 | Vienneau et al. | 345/473 |
| 2004/0002049 A1 * | 1/2004 | Beavers et al. | 434/350 |
| 2006/0023063 A1 | 2/2006 | Okawa | |
| 2006/0092269 A1 * | 5/2006 | Baird et al. | 348/14.08 |
| 2006/0093224 A1 * | 5/2006 | Uchino | 382/232 |
| 2006/0235869 A1 * | 10/2006 | Nagahashi et al. | 707/102 |

FOREIGN PATENT DOCUMENTS

| | | |
|---|---|---|
| CN | 1666503 A | 9/2005 |
| CN | 1732690 A | 2/2006 |
| EP | 1130506 A2 | 9/2001 |
| GB | 2378836 A | 2/2003 |
| JP | 2004120404 A | 4/2004 |

OTHER PUBLICATIONS

European Search Report of EP Application No./Patent No. 07001726.3-1522/1871100, dated Apr. 29, 2010.

* cited by examiner

SIMULTANEOUS VIDEO AND SUB-FRAME METADATA CAPTURE SYSTEM

CROSS REFERENCES TO RELATED APPLICATIONS

The present application is a continuation-in-part of Utility application Ser. No. 11/474,032 filed on Jun. 23, 2006, and entitled "VIDEO PROCESSING SYSTEM THAT GENERATES SUB-FRAME METADATA,", which claims priority to Provisional Application No. 60/802,423, filed May 22, 2006, both of which are incorporated herein in their entirety by reference for all purposes.

The present application also claims priority to Provisional Application No. 60/802,423, filed May 22, 2006.

The present application is related to the following co-pending applications:

1. Utility application Ser. No. 11/491,050 filed on even date herewith, and entitled "ADAPTIVE VIDEO PROCESSING CIRCUITRY & PLAYER USING SUB-FRAME METADATA"; and 2. Utility application Ser. No. 11/491,051 filed on even date herewith, and entitled "ADAPTIVE VIDEO PROCESSING USING SUB-FRAME METADATA", both of which are incorporated herein for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention is related generally to video processing devices, and more particularly to video capture and processing systems.

2. Description of Related Art

Movies and other video content are often captured using 35 mm film with a 16:9 aspect ratio. When a movie enters the primary movie market, the 35 mm film is reproduced and distributed to various movie theatres for sale of the movie to movie viewers. For example, movie theatres typically project the movie on a "big-screen" to an audience of paying viewers by sending high lumen light through the 35 mm film. Once a movie has left the "big-screen," the movie often enters a secondary market, in which distribution is accomplished by the sale of video discs or tapes (e.g., VHS tapes, DVD's, high-definition (HD)-DVD's, Blue-ray DVD's, and other recording mediums) containing the movie to individual viewers. Other options for secondary market distribution of the movie include download via the Internet and broadcasting by television network providers.

For distribution via the secondary market, the 35 mm film content is translated film frame by film frame into raw digital video. For HD resolution requiring at least 1920×1080 pixels per film frame, such raw digital video would require about 25 GB of storage for a two-hour movie. To avoid such storage requirements, encoders are typically applied to encode and compress the raw digital video, significantly reducing the storage requirements. Examples of encoding standards include, but are not limited to, Motion Pictures Expert Group (MPEG)-1, MPEG-2, MPEG-2-enhanced for HD, MPEG-4 AVC, H.261, H.263 and Society of Motion Picture and Television Engineers (SMPTE) VC-1.

To accommodate the demand for displaying movies on telephones, personal digital assistants (PDAs) and other handheld devices, compressed digital video data is typically downloaded via the Internet or otherwise uploaded or stored on the handheld device, and the handheld device decompresses and decodes the video data for display to a user on a video display associated with the handheld device. However, the size of such handheld devices typically restricts the size of the video display (screen) on the handheld device. For example, small screens on handheld devices are often sized just over two (2) inches diagonal. By comparison, televisions often have screens with a diagonal measurement of thirty to sixty inches or more. This difference in screen size has a profound affect on the viewer's perceived image quality.

For example, typical, conventional PDA's and high-end telephones have width to height screen ratios of the human eye. On a small screen, the human eye often fails to perceive small details, such as text, facial features, and distant objects. For example, in the movie theatre, a viewer of a panoramic scene that contains a distant actor and a roadway sign might easily be able to identify facial expressions and read the sign's text. On an HD television screen, such perception might also be possible. However, when translated to a small screen of a handheld device, perceiving the facial expressions and text often proves impossible due to limitations of the human eye.

Screen resolution is limited if not by technology then by the human eye no matter what the size screen. On a small screen however, such limitations have the greatest impact. For example, typical, conventional PDA's and high-end telephones have width to height screen ratios of 4:3 and are often capable of displaying QVGA video at a resolution of 320× 240 pixels. By contrast, HD televisions typically have screen ratios of 16:9 and are capable of displaying resolutions up to 1920×1080 pixels. In the process of converting HD video to fit the far lesser number of pixels of the smaller screen, pixel data is combined and details are effectively lost. An attempt to increase the number of pixels on the smaller screen to that of an HD television might avoid the conversion process, but, as mentioned previously, the human eye will impose its own limitations and details will still be lost.

Video is usually captured in the "big-screen" format, which serves well for theatre viewing. Because this video is later transcoded, the "big-screen" format video may not adequately support conversion to smaller screen sizes. In such case, no conversion process will produce suitable video for display on small screens. Further limitations and disadvantages of conventional and traditional approaches will become apparent to one of ordinary skill in the art through comparison of such systems with various aspects of the present invention.

BRIEF SUMMARY OF THE INVENTION

The present invention is directed to apparatus and methods of operation that are further described in the following Brief Description of the Drawings, the Detailed Description of the Invention, and the claims. Various features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
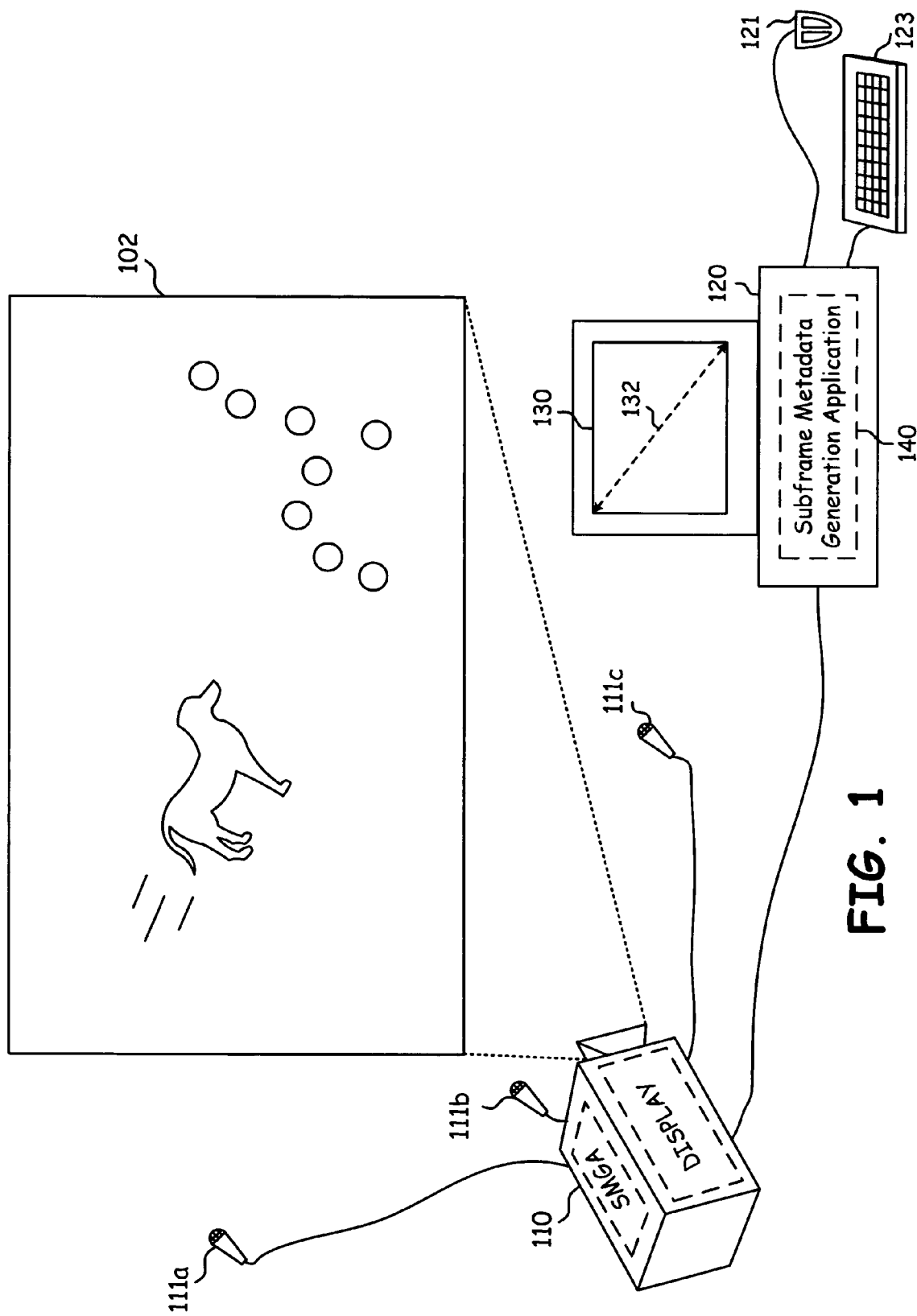
FIG. 1 is a system diagram illustrating an embodiment of a video processing system constructed according to the present invention.

FIG. 1 is a diagram illustrating an embodiment of a video processing system constructed according to the present invention. The video processing system 120 interfaces with a video camera 110 to receive a sequence of original video frames from the video camera 110. The sequence of original video frames captured by the video camera 110 is of scene 102. The scene 102 may be any type of a scene that is captured by a video camera 110. For example, the scene 102 may be that of a landscape having a relatively large capture area with great detail. Alternatively, the scene 102 may be head shots of actors having dialog with each other. Further, the scene 102 may be an action scene of a dog chasing a ball as the example of FIG. 1 illustrates. The scene 102 type typically changes from time to time during capture of original video frames.

With prior video capture systems, a user operates the camera 1 to capture original video frames of the scene 102 that were optimized for a "big-screen" format. With the present invention, the original video frames will be later converted for eventual presentation by target video players having respective video displays. Because the video processing system 120 captures differing types of scenes over time, the manner in which the captured video is converted to create sub-frames for viewing on the target video players also changes over time. The "big-screen" format does not always translate well to smaller screen types. Therefore, the video processing system 120 of the present invention supports the capture of original video frames that, upon conversion to smaller formats, provide high quality video sub-frames for display on one or more video displays of target video players.

To support the capture of original video frames that will produce high quality video sub-frames, the video processing system 120 operates a sub-frame metadata generation application 140, which may be a software application, dedicated hardware, or a combination of both hardware and software. The video processing system receives a sequence of original video frames representing the scene 102 from the video camera 110. The video processing system 120 includes a video display 130 that has a particular diagonal size indicated at numeral 132. The video processing system 120 provides video output to the video display 130 that represents the sequence of original video frames.

The video processing system 120 further receives signals representing user input from one or more user input devices. These user input devices may include a keyboard 123, a mouse 121, and/or other user input devices operable to receive user input. The video processing system 120, in response to the signals representing user input, presents sub-frames to the user upon the video display 130. Each sub-frame represents an image that would be presented upon the display of a target video player after conversion. Thus, the video processing system 120 allows the user to capture original video frames that will convert well to sub-frames for later viewing on the video display(s) of one or more target video players. The manner in which the sub-frame(s) is/are displayed will be described further with reference to FIGS. 2 through 4.

The video processing system 120 also generates metadata corresponding to the sub-frame(s). This metadata is to be used by a target video player in modifying the sequence of original video frames to produce a full screen presentation on a target video display of the target video player corresponding to the sub-frame. The manner in which the metadata is used to generate the full screen presentation on the target video display of the target video player will be described further with reference to FIGS. 4-13. In most or all cases, the video display 130 has a larger viewing area than that of the target video display. This concept will be described further with reference to FIGS. 2-13.

The video processing system 120 may also operate to receive audio information corresponding to the sequence of original video frames. The video processing system 120 receives the audio information from a plurality of microphones 111A, 111B, and 111C. In one implementation, the plurality of microphones 111A, 111B, and 111C are spatially diverse to capture different audio information relating to the scene 102. According to the present invention, the video processing system modifies the audio information captured by the plurality of microphones 111A, 111B, and 111C based upon the user input and in a manner corresponding to the sub-frames. Further, the metadata may include additional information that is used by the target video player in modifying the audio information for presentation corresponding to the sub-frame.

Figure 2:
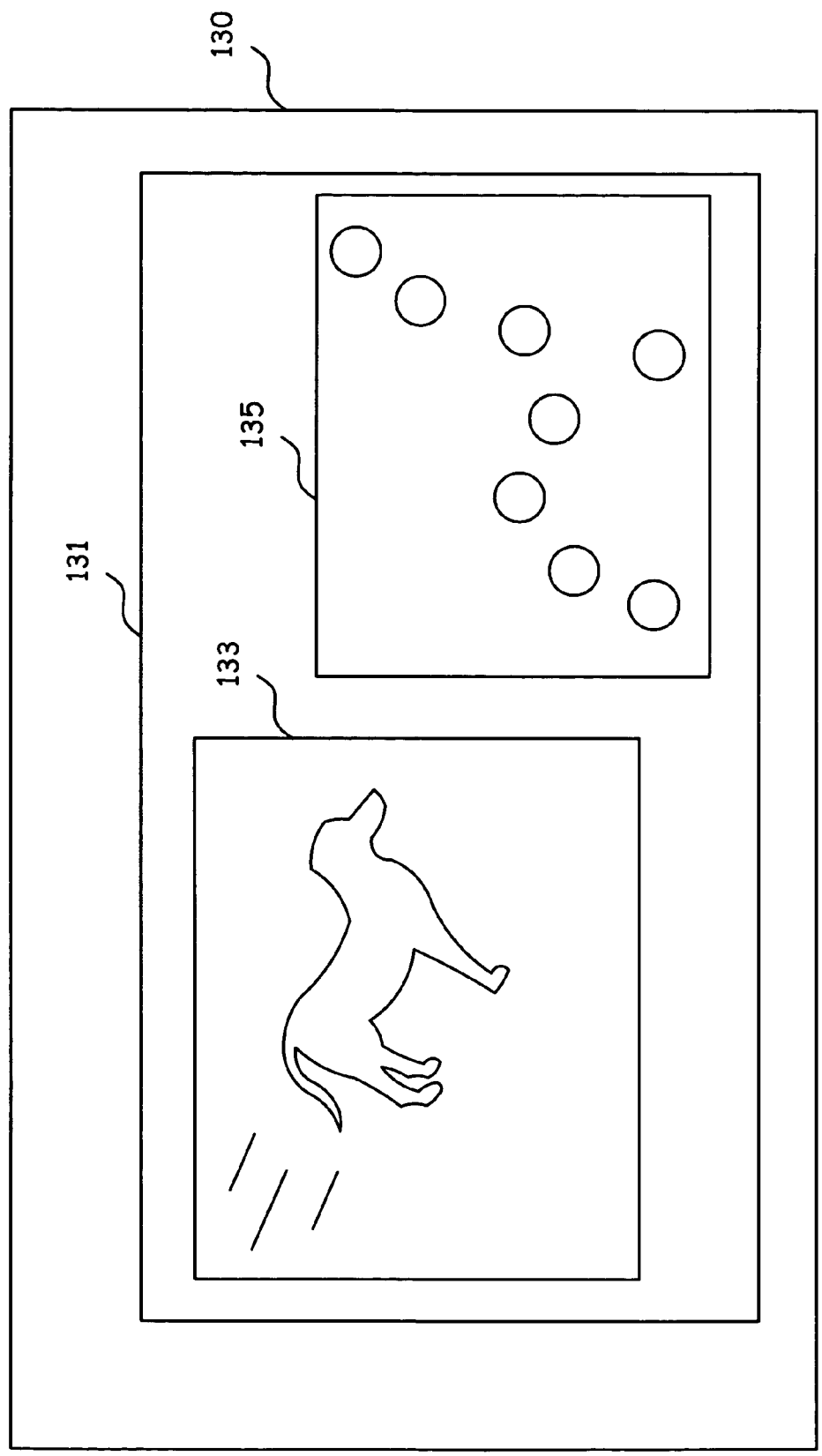
FIG. 2 is a block diagram illustrating the placement of sub-frames on a video display of a video processing system constructed according to an embodiment of the present invention.

FIG. 2 is a block diagram illustrating the placement of sub-frames on a video display of a video processing system constructed according to an embodiment of the present invention. As is shown, the video display 130 has a viewing area in the sequence of original video frames representing the scene 102 of FIG. 1 is displayed. According to the embodiment of FIG. 2, the video processing system 120 is further operable to respond to additional signals representing user input by presenting, in addition to sub-frame 131, additional sub-frames 133 and 135 on the video display 130 in association with the sequence of original video frames. Each of these sub-frames 131 would have an aspect ratio and size corresponding to one of a plurality of target video displays. Further, the video processing system 120 produces metadata associated with each of these sub-frames 131, 133, and 135. The metadata that the video processing system 120 generates that is associated with the plurality of sub-frames 131, 133, and 135 enables a corresponding target video display to produce a corresponding presentation on its video display. In the example of FIG. 2, the video processing system 120 includes a single video display 130 upon which each of the plurality of sub-frames 131, 133, and 135 are displayed. In another embodiment, as will be described further with reference to FIG. 4, each of the plurality of sub-frames generated by the video processing system may be independently displayed on a corresponding target video player.

With the example of FIG. 2, at least two of the sub-frames 133 and 135 of the set of sub-frames may correspond to a single frame of the sequence of original video frames. Thus, for example, with a particular target video player, sub-frames 133 and 135 and the related video information contained therein may be presented at differing times on a single target video player. With the example of FIG. 2, a first portion of video presented by the target video player may show a dog chasing a ball as contained in sub-frame 133 while a second portion of video presented by the target video player shows the bouncing ball as it is illustrated in sub-frame 135. Thus, with this example, video sequences of a target video player that are adjacent in time are created from a single sequence of original video frames.

Further, with the example of FIG. 2, at least two sub-frames of the set of sub-frames may include an object whose spatial position varies over the sequence of original video frames. In such frames, the spatial position of the sub-frame 133 that identifies the dog would vary over the sequence of original video frames with respect to the sub-frame 135 that indicates the bouncing ball. Further, with the example of FIG. 2, two sub-frames of the set of sub-frames may correspond to at least two different frames of the sequence of original video frames. With this example, sub-frames 133 and 135 may correspond to differing frames of the sequence of original video frames displayed on the video display 130. With this example, during a first time period, sub-frame 133 is selected to display an image of the dog over a period of time. Further, with this example, sub-frames 135 would correspond to a different time period to show the bouncing ball. With this example, at least a portion of the set of sub-frames 133 and 135 may correspond to a sub-scene of a scene depicted across the sequence of original video frames. This sequence depicted may be depicted across the complete display 130 or sub-frame 131.

Figure 3:
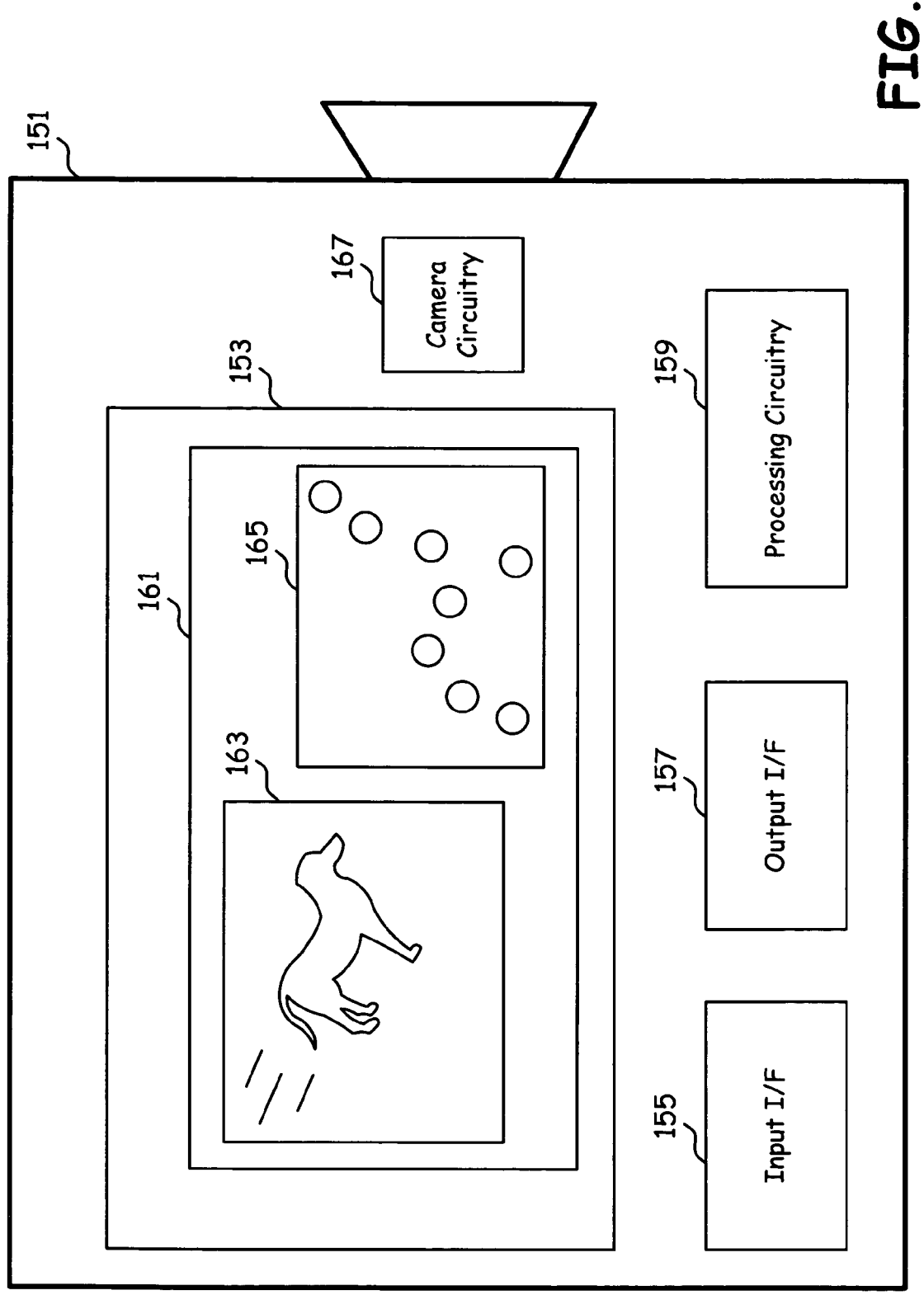
FIG. 3 is a block diagram illustrating another embodiment of a video processing system constructed according to the present invention.

FIG. 3 is a block diagram illustrating another embodiment of a video processing system constructed according to the present invention. The video processing system 151 of FIG. 3 differs from that of the embodiment of FIG. 1 in that all components including a camera are included in a single unit. The video processing system 151 therefore includes a display 153, an input interface 155, an output interface 157, processing circuitry 159, and camera circuitry 167. The components 153, 155, 157, 159, and 167 of the video processing system 151 of FIG. 3 are coupled as is required to support the functions the video processing system 151. The interfaces 155 and 157 and the coupling of the components of the video processing system 151 will be described further with reference to FIG. 5. The coupling among the components of the video processing system will be described further herein as it relates to the teachings of the present invention.

With the embodiment of FIG. 3, the video processing system 151 captures the sequence of original video frames using its camera circuitry 167. The input interface 155 is operable to receive signals representing user input from a user. The processing circuitry 159 couples to the camera circuitry 167, the video display 153, and the input interface 155 and is operable to present at least one frame of the sequence of original frames on the video display 153. Further, the processing circuitry 159 is operable to respond to the signals representing user input to present at least one sub-frame 161, 163, and/or 165 on the video display 153. With the embodiment of FIG. 3, each sub-frame 161, 163, and 165 may correspond to a region in the at least one frame in the sequence of original video frames that is identified in the signals representing user input.

The processing circuitry 159 is also operable to generate metadata corresponding to the sub-frames 161, 163, and/or 165. As was the case with the embodiment of FIG. 1, with the embodiment of FIG. 3, the metadata is to be used by a target video player in modifying the sequence of original video frames to produce a full screen presentation on the target video display of the target video player corresponding to the sub-frame. As was also the case with the embodiment of FIG. 1, the video display 153 has a larger viewing area than that of the target video display.

Figure 4:
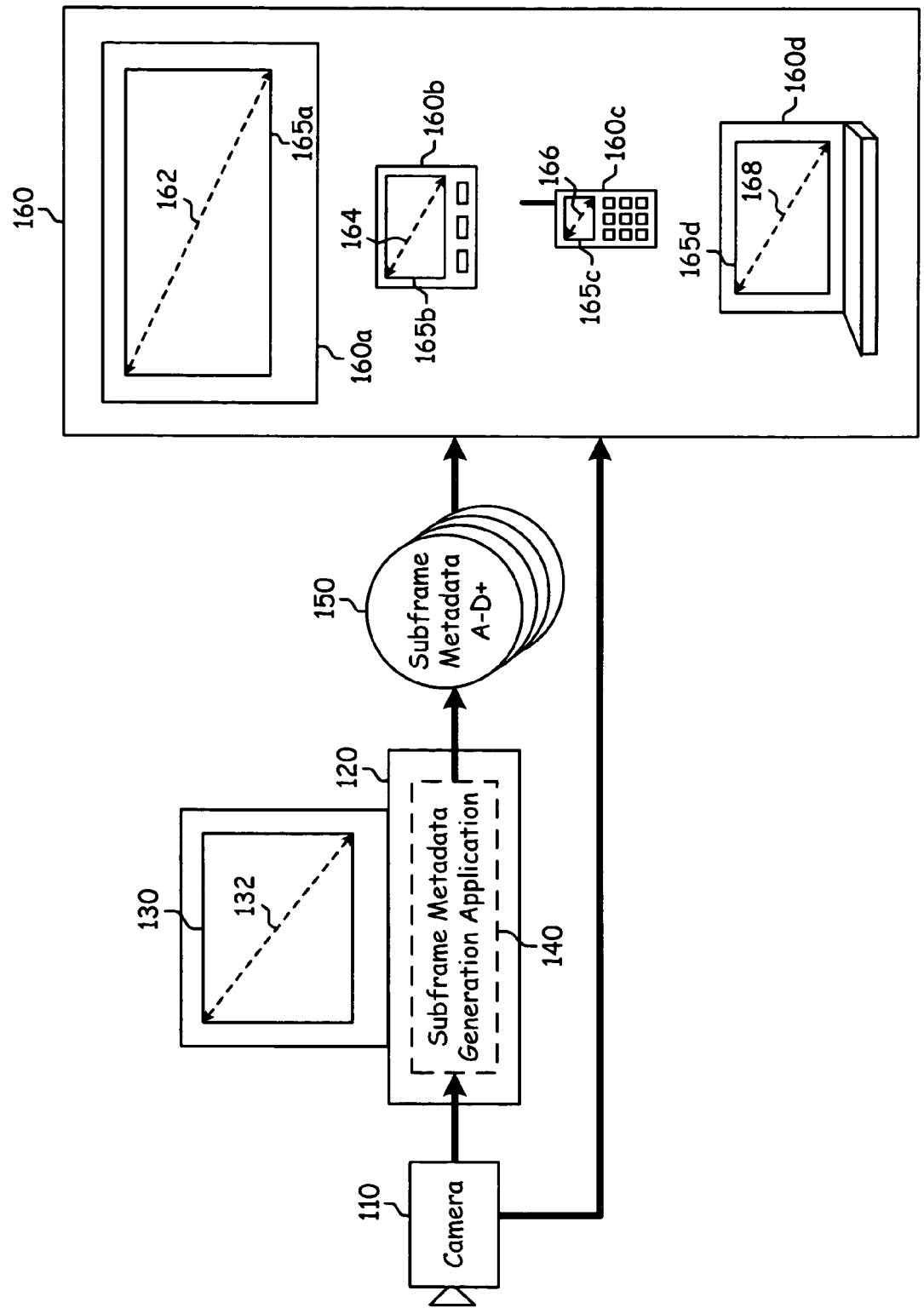
FIG. 4 is a schematic block diagram illustrating another embodiment of a video processing system according to the present invention.

FIG. 4 is a schematic block diagram illustrating another embodiment of a video processing system according to the present invention. The video processing system 120 is a computer or other device capable of processing video data received from camera and to produce output to the a display 130 that is communicatively coupled to the video processing system 120. The camera 110 captures the sequence of original video frames containing video content in any format. In one embodiment, the video data is high definition video data, in which each video frame is formed for example of 1920×1080 pixels horizontal by longitudinal in a 16:9 aspect ratio. In another embodiment, the video data is standard or low definition video data, in which each video frame is formed of a certain number of pixels in a 4:3 aspect ratio. For example, if the standard video data is national television system committee (NTSC) video data, each video frame is formed of 720× 486 or 720×540 pixels horizontal by longitudinal. As another example, if the standard video data is phase alternation by line (PAL) video data, each video frame is formed of 720×576 pixels horizontal by longitudinal. In addition, the video data 115 may be either encoded and compressed using any coding standard, e.g., MPEG-1, MPEG-2, MPEG-2-enhanced for HD, MPEG-4 AVC, H.261, H.263 and SMPTE VC-1, uncompressed and encoded or uncompressed and not encoded.

The video processing system 120 further implements a sub-frame metadata generation application 140. As used herein, the term "sub-frame metadata generation application" refers to any type of hardware, software, and/or firmware necessary for performing the functions of the sub-frame metadata generation application 140 discussed below. In general, the sub-frame metadata generation application 140 takes as input the video data generated by the camera 110 and generates sub-frame metadata 150 from the video data 115 for use in modifying the video data 115 for display on differently sized target video displays 165 of different video display devices 160.

Examples of video display devices 160 include, but are not limited to, a television 160a, a personal digital assistant (PDA) 160b, a cellular telephone 160c and a laptop computer 160d. Each video display device 160a-160d is communicatively coupled to a respective video display 165a-165d, each having a respective size (or viewing area) 162, 165, 166 and 168. The viewing area 162, 164, 166 and 168 of each video display 165a-165d, respectively, is measured diagonally across the respective display 165a-165d. The video displays 165b and 165c of the PDA 160b and cellular telephone 160c, respectively, represent small video displays, while the video displays 165a and 165d of the television 160a and laptop computer 160d represent large video displays. As used herein, the term "small video display" refers to a video display whose viewing area (e.g., 164 and 166) is less than the viewing area 132 of the display 130 associated with the video processing system 120 that generated the sub-frame metadata 150.

In one operation, the sub-frame metadata generation application 140 is operable to receive the video data from the camera 110, to display the video data on the display 130 to a user, receive user input from the user in response to the displayed video data, and generate the sub-frame metadata 150 in response to the user input. More particularly, the sub-frame metadata generation application 140 is operable to present at least one frame of the sequence of original video frames in the video data to the user on the display 130, receive as user input sub-frame information identifying a sub-frame corresponding to a region of interest within a scene depicted in the displayed frame(s) and generate the sub-frame metadata 150 from the sub-frame information. As user herein, the term "sub-frame" includes at least a portion of an original video frame, but may include the entire original video frame. The resulting sub-frame metadata 150 defines a sequence of sub-frames that modify the sequence of original video frames (video data) in order to produce a full screen presentation of the sub-frames on a target video display 165a-165d.

The sub-frame metadata 150 generated by the sub-frame metadata generation application 140 may include one or more sets of sub-frame metadata 150, each specifically generated for a particular target video display 165a-165d and/or a video display 165a-165d of a particular size 162-168. Thus, for display on a particular video display (e.g., display 165a), each of the video display devices 160 receive and modify the original video data by a received one of the set of sub-frame metadata 150 specifically generated for that video display 165. For example, after receiving both the original video data and one of the sets of sub-frame metadata 150 (i.e., sub-frame metadata set C), the cellular telephone 160c modifies the original video data using the received set of the sub-frame metadata 150 and displays the modified video on its video display, the video display 165c.

In addition, the sub-frame metadata generation application 140 may be further operable to add editing information to the sub-frame metadata 150 for application by a target video display device to the original video data. For example, in one embodiment, the editing information is provided by the user as additional user input in response to an interactive display of the original video data. The editing information is received by the sub-frame metadata generation application 140 and included as part of the generated sub-frame metadata 150.

Examples of editing information include, but are not limited to, a pan direction and pan rate, a zoom rate, a contrast adjustment, a brightness adjustment, a filter parameter, and a video effect parameter. More specifically, associated with a sub-frame, there are several types of editing information that may be applied including those related to: a) visual modification, e.g., brightness, filtering, video effects, contrast and tint adjustments; b) motion information, e.g., panning, acceleration, velocity, direction of sub-frame movement over a sequence of original frames; c) resizing information, e.g., zooming (including zoom in, out and rate) of a sub-frame over a sequence of original frames; and d) supplemental media of any type to be associated, combined or overlaid with those portions of the original video data that falls within the sub-frame (e.g., a text or graphic overlay or supplemental audio.

Referring to all of FIGS. 1 through 4, the video processing system 120 of the present invention assists directors and/or camera operators in the capture of original video frames. By providing immediate feedback to the directors and/or camera operators by way of the presentation of sub-frames along with the original video frames, the video processing system allows the directors and/or camera operators to ensure that the captured original video data will translate well to all contemplated target video players. Using the feedback provided by the video processing system 120, the directors, and/or camera operators can alter the operation of the camera 110 so that appropriate original video frames are captured.

Figure 5:
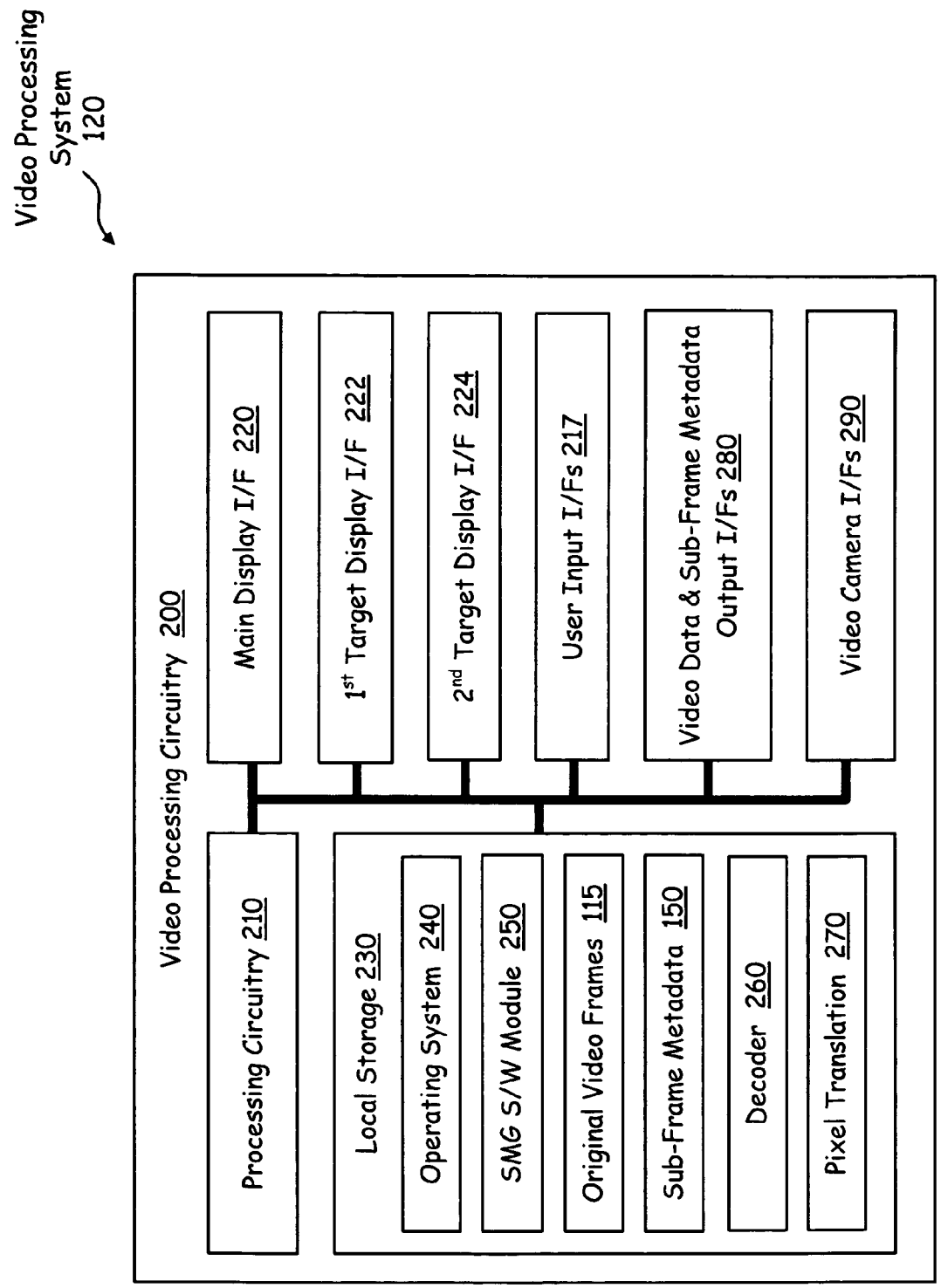
FIG. 5 is a schematic block diagram illustrating structure of an embodiment of a video processing device according to the present invention.

FIG. 5 is a schematic block diagram illustrating structure of an embodiment of a video processing device according to the present invention. The video processing system 120 includes video processing circuitry 200 operable to process video data and to generate the sub-frame metadata 150 from the video data. The video processing circuitry 200 includes processing circuitry 210 and local storage 230 communicatively coupled to the processing circuitry 210. The local storage 210 stores, and the processing circuitry 210 executes, operational instructions corresponding to at least some of the functions illustrated herein. For example, in one embodiment, the local storage 210 maintains an operating system 240, a sub-frame metadata generation software module 250, a decoder 260, and a pixel translation module 270.

The sub-frame metadata generation software module 250 includes instructions executable by the processing circuitry 210 for generating the sub-frame metadata 150 from the video data and the user input. Thus, the sub-frame metadata generation software module 250 provides instructions to the processing circuitry 210 for receiving, storing, and retrieving the sequence of original video frames 115, displaying the original video frames 115 to a user, receiving, processing user input from the user in response to the displayed original video frames, generating the sub-frames for presentation to on a video display, and generating the sub-frame metadata 150 in response to the user input.

In embodiments in which the video data 115 is encoded, the decoder 260 includes instructions executable by the processing circuitry 210 to decode the encoded video data to produce decoded video data. For example, in discrete cosine transform (DCT)-based encoding/compression formats (e.g., MPEG-1, MPEG-2, MPEG-2-enhanced for HD, MPEG-4 AVC, H.261 and H.263), motion vectors are used to construct frame or field-based predictions from neighboring frames or fields by taking into account the inter-frame or inter-field motion that is typically present. As an example, when using an MPEG coding standard, a sequence of original video frames is encoded as a sequence of three different types of frames: "I" frames, "B" frames and "P" frames. "I" frames are intra-coded, while "P" frames and "B" frames are inter-coded. Thus, I-frames are independent, i.e., they can be reconstructed without reference to any other frame, while P-frames and B-frames are dependent, i.e., they depend upon another frame for reconstruction. More specifically, P-frames are forward predicted from the last I-frame or P-frame and B-frames are both forward predicted and backward predicted from the last/next I-frame or P-frame. The sequence of IPB frames is compressed utilizing the DCT to transform N×N blocks of pixel data in an "I", "P" or "B" frame, where N is usually set to 8, into the DCT domain where quantization is more readily performed. Run-length encoding and entropy encoding are then applied to the quantized bitstream to produce a compressed bitstream which has a significantly reduced bit rate than the original uncompressed video data. The decoder 260 decompresses the compressed video data to reproduce the encoded video data, and then decodes the encoded video data to produce the sequence of original video frames (decoded video data).

The decoded video data is provided to the processing circuitry 210 by the sub-frame metadata generation software module 250 for display of the original video frames to the user and generation of the sub-frame metadata 150. For example, in one embodiment, the sub-frame metadata 150 is generated by reference to the original sequence of video frames. In another embodiment, if the video data 115 is encoded using, for example, the MPEG coding standard, in which the original sequence of video frames is encoded as a sequence of "I", "P" and "B" frames, the sub-frame metadata 150 may be generated by reference to the IPB sequence (encoded) sequence of video frames.

The pixel translation module 270 includes instructions executable by the processing circuitry 210 to translate the pixel resolution of the video data 115 to the pixel resolution of the target video display associated with the sub-frame metadata 150. For example, in embodiments in which the pixel resolution of the video data 115 is high definition resolution (e.g., 1920×1080 pixels per frame), and the target video display associated with the sub-frame metadata 150 has a resolution of only 320×240 pixels per frame, the pixel translation module 270 translates the video data 115 from 1920×1080 pixels per frame to 320×240 pixels per frame for proper display on the target video display.

The processing circuitry 210 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The local storage 230 may be a single memory device or a plurality of memory devices. Such a memory device may be a read-only memory, random access memory, volatile memory, non-volatile memory, static memory, dynamic memory, flash memory, and/or any device that stores digital information. Note that when the processing circuitry 210 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The video processing circuitry 200 further includes a main display interface 220, a first target display interface 222, a second target display interface 224, a user input interface 217, a full-frame video and sub-frame metadata output interface 280 and a video camera input interface 290, each communicatively coupled to the local storage 230 and the processing circuitry 210. The main display interface 220 provides an interface to the main display of the video processing device, while the first target display interface 222 and second target display interface 224 each provide a respective interface towards a respective target video display on which the video data 115 as modified by the sub-frame metadata 150 may be displayed. The user input interface(s) 217 provide one or more interfaces for receiving user input via one or more input devices (e.g., mouse, keyboard, etc.) from a user operating the video processing system 120. For example, such user input can include sub-frame information identifying a region of interest (sub-frame) within a scene depicted in the displayed frame(s) and editing information for use in editing the sub-frame information.

The video data and sub-frame metadata output interface(s) 280 provide one or more interfaces for outputting the video data 115 and generated sub-frame metadata 150. For example, the video data and sub-frame metadata output interfaces 280 may include interfaces to storage mediums (e.g., video disc, video tape or other storage media) for storing the video data 115 and sub-frame metadata 150, interfaces to transmission mediums for transmission of the video data 115 and sub-frame metadata 150 (e.g., transmission via the Internet, an Intranet or other network) and/or interfaces to additional processing circuitry to perform further processing on the video data 115 and sub-frame metadata 150. The video camera interface(s) 290 include one or more interfaces for receiving the video data 115 in a compressed or uncompressed format.

In another operation, upon initiation of the sub-frame metadata generation software module 250, the sub-frame metadata generation software module 250 provides instructions to the processing circuitry 210 to either receive the video data 115 via video camera interface 290 or retrieve previously stored video data 115 from local storage 230. If the video data 115 is encoded, the sub-frame metadata generation software module 250 further provides instructions to the processing circuitry 210 to access the decoder 260 and decode the encoded video data using the instructions provided by the decoder 260.

The sub-frame metadata generation software module 250 then provides instructions to the processing circuitry 210 to retrieve at least one frame in the sequence of original video frames from the video data 115 and display the original video frame(s) to the user via the main display interface 220. In response to receipt of user input identifying a sub-frame corresponding to a region of interest within a scene depicted in the displayed frame(s) via user input interface 217, the sub-frame metadata generation software module 250 then provides instructions to the processing circuitry 210 to generate the sub-frame metadata 150 from the user input, and to store the generated sub-frame metadata 150 in the local storage 230. In embodiments requiring pixel translation, the sub-frame metadata generation software module 250 further instructs the processing circuitry 210 to access the pixel translation module 270 to generate the sub-frame metadata 150 with the appropriate pixel resolution.

Depending on the type(s) of target video displays for which the sub-frame metadata generation software module 250 is programmed for, the sub-frame metadata 150 generated by the sub-frame metadata generation software module 250 may include one or more sets of sub-frame metadata 150, each specifically generated for a particular target video display. For example, in one embodiment, for display on a particular video display (e.g., first target video display), the processing circuitry 210 outputs the original video data and the set of sub-frame metadata 150 for the first target video display via the first target display interface 222. In another embodiment, the processing circuitry 210 outputs the original video data and one or more sets of sub-frame metadata 150 via output interface(s) 280 for subsequent processing, storage or transmission thereof.

Figure 6:
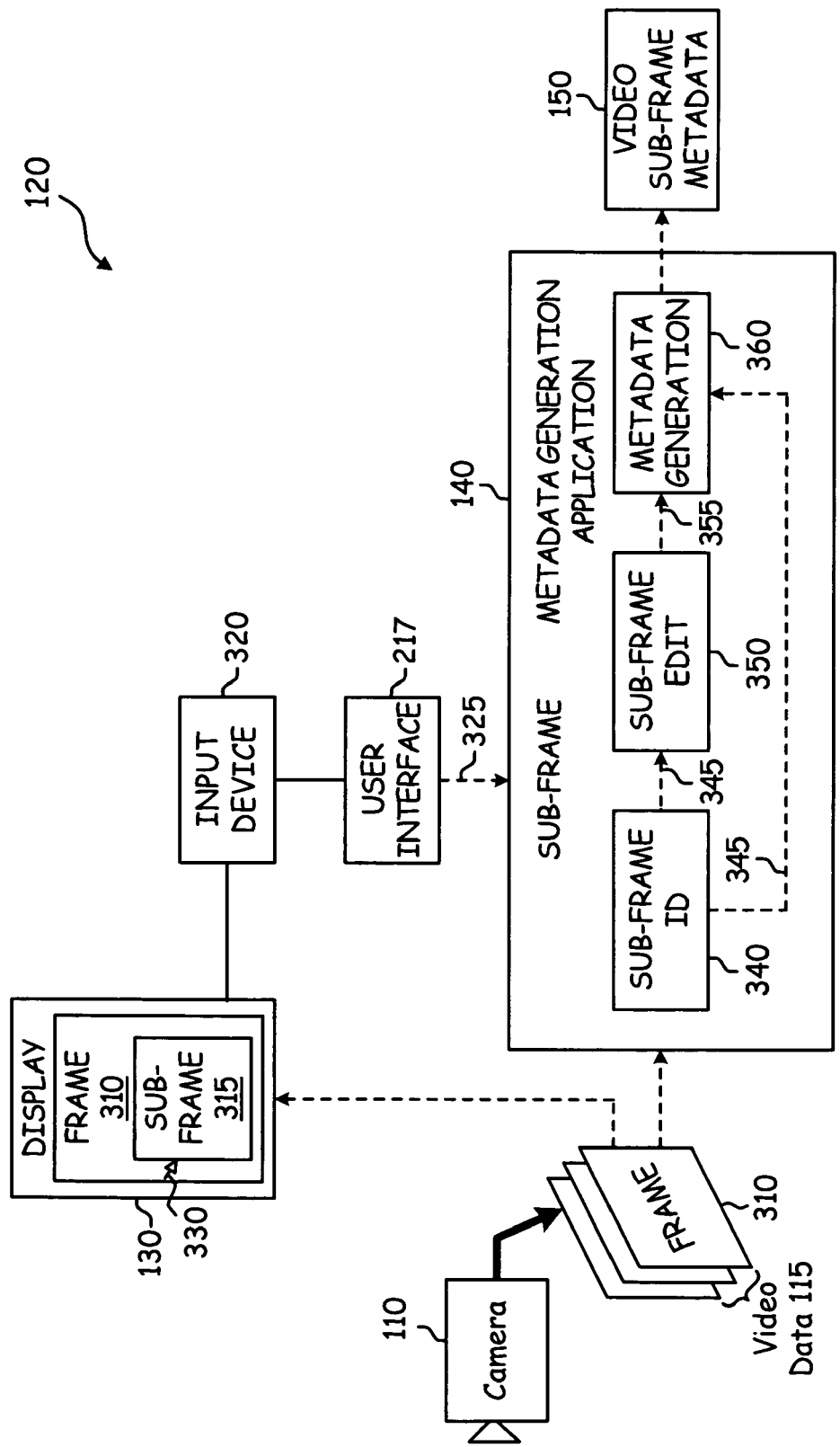
FIG. 6 is a schematic block diagram illustrating an embodiment of operation of a video processing device in generating sub-frame metadata in accordance with the present invention.

FIG. 6 is a schematic block diagram illustrating an embodiment of operation of a video processing device in generating sub-frame metadata in accordance with the present invention. In FIG. 6, the video data 115 is represented as a sequence of original video frames 310. Each frame 310 in the sequence of original video frames (video data 115) is input to the sub-frame metadata generation application 140 for generation of the sub-frame metadata 150 there from. In addition, each frame 310 in the sequence of original video frames may be displayed on the display 130 of the video processing system 120, as described above in connection with FIGS. 1-5, for viewing and manipulation by a user.

For example, a user may operate an input device 320, such as a mouse, to control the position of a cursor 330 on the display 130. The cursor 330 may be used to identify a sub-frame 315 corresponding to a region of interest in the current frame 310 displayed on the display 130. As an example, a user may utilize the cursor 330 to create a window on the display and to control the size and position of the window on the display 130 by performing a series of clicking and dragging operations on the mouse 320. Once the user has created the window on the display 130 using the input device 320, the user may further use the input device 320 to indicate that the window defines a sub-frame 315 by providing user signals 325 to the sub-frame metadata generation application 140 via the user interface 217. From the user signals 325, the sub-frame metadata generation application 140 generates the sub-frame metadata 150. For example, the sub-frame metadata 150 may identify the spatial position of the center of the window on the current frame 310 (e.g., a pixel location on the current frame 310 that corresponds to the center of the window) and a size of the window (e.g., the length and width of the window in numbers of pixels).

The sub-frame metadata generation application 140 includes a sub-frame identification module 340, a sub-frame editing module 350, and a metadata generation module 360. Upon receiving user signals 325 that create a sub-frame 315, the sub-frame identification module 340 assigns a sub-frame identifier 345 to the sub-frame. The sub-frame identifier 345 is used to identify the sub-frame in a sequence of sub-frames defined by the sub-frame metadata 150.

The sub-frame editing module 350 responds to additional user signals 325 that perform editing on the sub-frame. For example, once the user has created the sub-frame 315 using the input device 320, the user can further use the input device 320 to edit the sub-frame 315 and provide user signals 325 characterizing the editing to the sub-frame metadata generation application 140 via the user interface 217. The user signals are input to the sub-frame editing module 350 to generate editing information 355 describing the editing performed on the sub-frame 315. The editing information 355 is included in the sub-frame metadata 150 for use in editing the sub-frame 315 at the target display device prior to display on the target video display. Although editing information might be specified to apply to the entire video data, most editing information applies to a specific one or more sub-frames.

Examples of editing information 355 include, but are not limited to, a pan direction and pan rate, a zoom rate, a contrast adjustment, a brightness adjustment, a filter parameter and a video effect parameter. Examples of video effects include, but are not limited to, wipes, fades, dissolves, surface and object morphing, spotlights and high lights, color and pattern fill, video or graphic overlays, color correction, 3D perspective correction and 3D texture mapping. Another example of a video effect includes "time shifting." A first sequence defined by a first sub-frame might be slowed down upon playback by merely including in the metadata editing information associated with the first sub-frame that directs such a slow down. A second sequence associated with a second sub-frame might receive normal playback, and playback of a third sequence associated with a third sub-frame might be speeded up. Time shifting implementations might include increasing and decreasing frame rates or merely duplicating or discarding selected frames within the original video sequence, or might in a more complex manner combine frames to produce additional frames or reduce the overall number, for example.

The sub-frame identifier 345 assigned by the sub-frame identification module 340, the editing information 355 generated by the sub-frame editing module 350, the current original video frame 310 and user signals 325 defining the size and location of the sub-frame 315 are input to the sub-frame metadata generation module 360 for generation of the sub-frame metadata 150. In general, for each sub-frame 315, the sub-frame metadata 150 includes the sub-frame identifier 345, an identifier of the original video frame 310 from which the sub-frame 315 is taken, the location and size of the sub-frame 315 with respect to the original video frame 310 and any editing information 355 related to the sub-frame 315.

The sub-frame metadata generation module 360 generates the sub-frame metadata 150 for each sub-frame 315, and outputs aggregate sub-frame metadata 150 that defines a sequence of sub-frames 315. The sequence of sub-frames 315 can include one sub-frame 315 for each original video frame 310, multiple sub-frames 315 displayed sequentially for each original video frame 310, multiple sub-frames 315 corresponding to a sub-scene of a scene depicted across a sequence of original video frames 310 or multiple sub-frames 315 for multiple sub-scenes depicted across a sequence of original video frames 310. For example, the sub-frame metadata 150 may include sequencing metadata that both identifies a sequence of sub-scenes and identifies each of the sub-frames 315 associated with each sub-scene in the sequence of sub-scenes.

The sub-frame metadata 150 may further indicate the relative difference in location of the sub-frames 315 within a sub-scene. For example, in one embodiment, the sub-frame metadata 150 may indicate that each sub-frame 315 in the sub-scene is located at the same fixed spatial position on the video display 130 (e.g., each sub-frame 315 includes the same pixel locations). In another embodiment, the sub-frame metadata 150 may indicate that the spatial position of each sub-frame 315 in the sub-scene varies over the sub-frames. For example, each of the sub-frames 315 in the sequence of sub-frames for the sub-scene may include an object whose spatial position varies over the corresponding sequence of original video frames.

Figure 7:
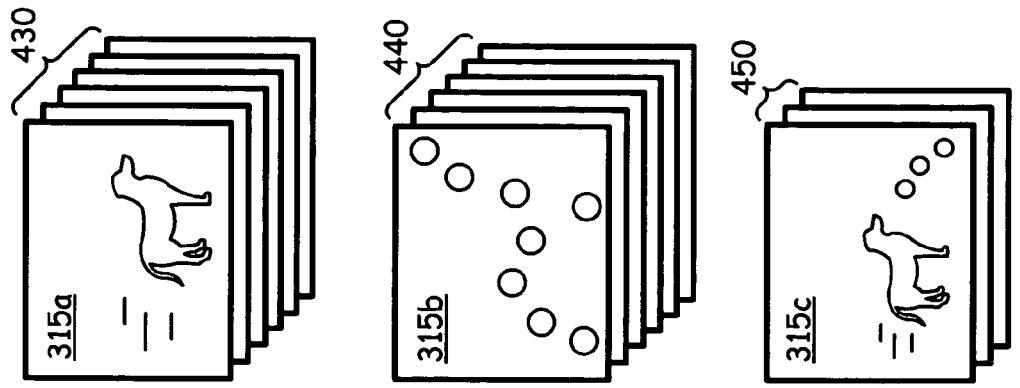
FIG. 7 is a diagram illustrating exemplary original video frames and corresponding sub-frames.
Figure 7:
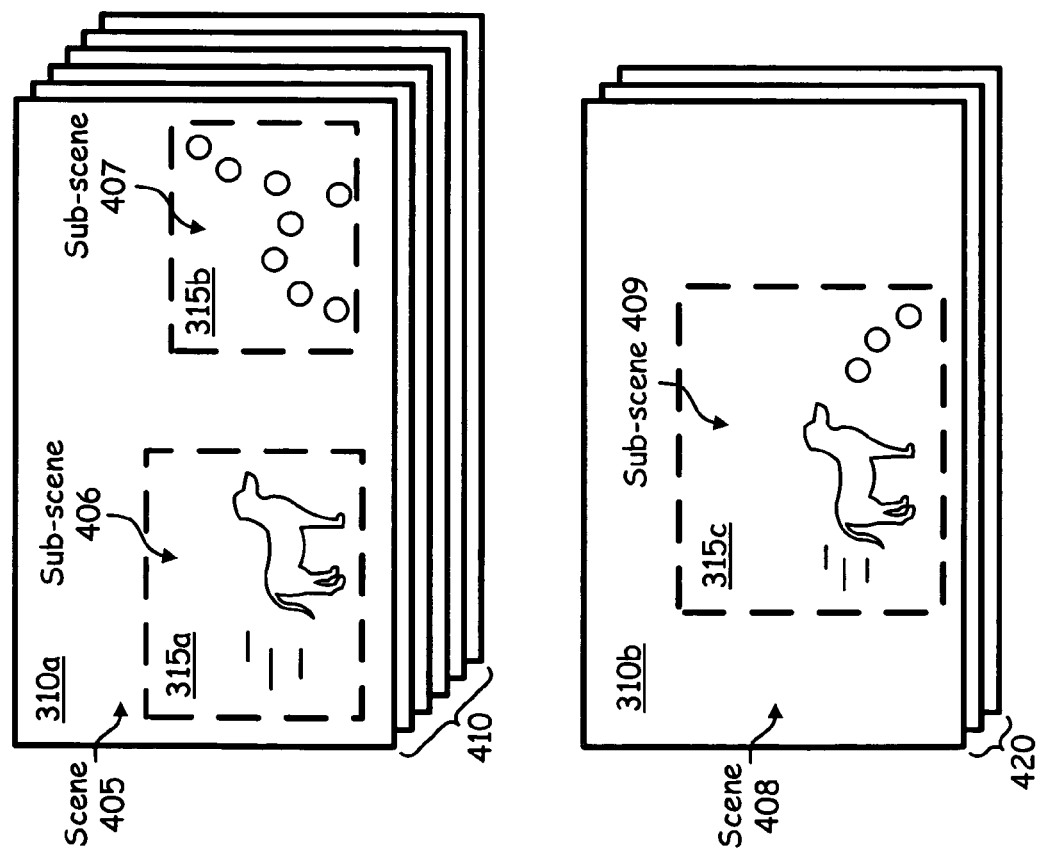

FIG. 7 is a diagram illustrating exemplary original video frames and corresponding sub-frames. In FIG. 7, a first scene 405 is depicted across a first sequence 410 of original video frames 310 and a second scene 408 is depicted across a second sequence 420 of original video frames 310. Thus, each scene 405 and 408 includes a respective sequence 410 and 420 of original video frames 310, and is viewed by sequentially displaying each of the original video frames 310 in the respective sequence 410 and 420 of original video frames 310.

However, to display each of the scenes 405 and 408 on a small video display without reducing the viewer's perceived video quality, each of the scenes 405 and 408 can be divided into sub-scenes that are separately displayed. For example, as shown in FIG. 7, within the first scene 405, there are two sub-scenes 406 and 407, and within the second scene 408, there is one sub-scene 409. Just as each scene 405 and 408 may be viewed by sequentially displaying a respective sequence 410 and 420 of original video frames 310, each sub-scene 406, 407, and 409 may also be viewed by displaying a respective sequence of sub-frames 315.

For example, looking at the first frame 310a within the first sequence 410 of original video frames, a user can identify two sub-frames 315a and 315b, each containing video data representing a different sub-scene 406 and 407. Assuming the sub-scenes 406 and 407 continue throughout the first sequence 410 of original video frames 310, the user can further identify two sub-frames 315, one for each sub-scene 406 and 407, in each of the subsequent original video frames 310 in the first sequence 410 of original video frames 310. The result is a first sequence 430 of sub-frames 315a, in which each of the sub-frames 315a in the first sequence 430 of sub-frames 315a contains video content representing sub-scene 406, and a second sequence 440 of sub-frames 315b, in which each of the sub-frames 315b in the second sequence 440 of sub-frames 315b contains video content representing sub-scene 407. Each sequence 430 and 440 of sub-frames 315a and 315b can be sequentially displayed. For example, all sub-frames 315a corresponding to the first sub-scene 406 can be displayed sequentially followed by the sequential display of all sub-frames 315 corresponding to the second sub-scene 407. In this way, the movie retains the logical flow of the scene 405, while allowing a viewer to perceive small details in the scene 405.

Likewise, looking at the first frame 310b within the second sequence 420 of original video frames, a user can identify a sub-frame 315c corresponding to sub-scene 409. Again, assuming the sub-scene 409 continues throughout the second sequence 420 of original video frames 310, the user can further identify the sub-frame 315c containing the sub-scene 409 in each of the subsequent original video frames 310 in the second sequence 420 of original video frames 310. The result is a sequence 450 of sub-frames 315c, in which each of the sub-frames 315c in the sequence 450 of sub-frames 315c contains video content representing sub-scene 409.

Figure 8:
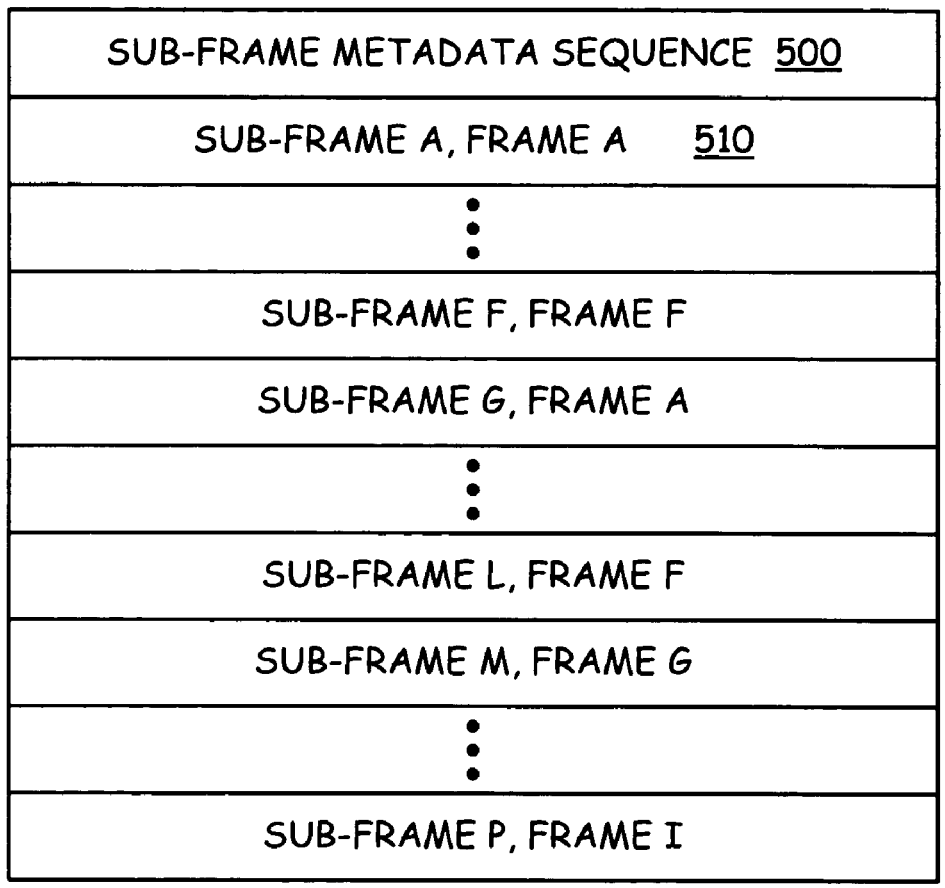
FIG. 8 is a chart illustrating exemplary sub-frame metadata for a sequence of sub-frames.

FIG. 8 is a chart illustrating exemplary sub-frame metadata for a sequence of sub-frames. Within the sub-frame metadata 150 shown in FIG. 8 is sequencing metadata 500 that indicates the sequence (i.e., order of display) of the sub-frames. For example, the sequencing metadata 500 can identify a sequence of sub-scenes and a sequence of sub-frames for each sub-scene. Using the example shown in FIG. 7, the sequencing metadata 500 can be divided into groups 520 of sub-frame metadata 150, with each group 520 corresponding to a particular sub-scene.

For example, in the first group 520, the sequencing metadata 500 begins with the first sub-frame (e.g., sub-frame 315a) in the first sequence (e.g., sequence 430) of sub-frames, followed by each additional sub-frame in the first sequence 430. In FIG. 8, the first sub-frame in the first sequence is labeled sub-frame A of original video frame A and the last sub-frame in the first sequence is labeled sub-frame F of original video frame F. After the last sub-frame in the first sequence 430, the sequencing metadata 500 continues with the second group 520, which begins with the first sub-frame (e.g., sub-frame 315b) in the second sequence (e.g., sequence 440) of sub-frames and ends with the last sub-frame in the second sequence 440. In FIG. 8, the first sub-frame in the second sequence is labeled sub-frame G of original video frame A and the last sub-frame in the first sequence is labeled sub-frame L of original video frame F. The final group 520 begins with the first sub-frame (e.g., sub-frame 315c) in the third sequence (e.g., sequence 450) of sub-frames and ends with the last sub-frame in the third sequence 450. In FIG. 8, the first sub-frame in the first sequence is labeled sub-frame M of original video frame G and the last sub-frame in the first sequence is labeled sub-frame P of original video frame I.

Within each group 520 is the sub-frame metadata for each individual sub-frame in the group 520. For example, the first group 520 includes the sub-frame metadata 150 for each of the sub-frames in the first sequence 430 of sub-frames. In an exemplary embodiment, the sub-frame metadata 150 can be organized as a metadata text file containing a number of entries 510. Each entry 510 in the metadata text file includes the sub-frame metadata 150 for a particular sub-frame. Thus, each entry 510 in the metadata text file includes a sub-frame identifier identifying the particular sub-frame associated with the metadata and references one of the frames in the sequence of original video frames.

Figure 9:
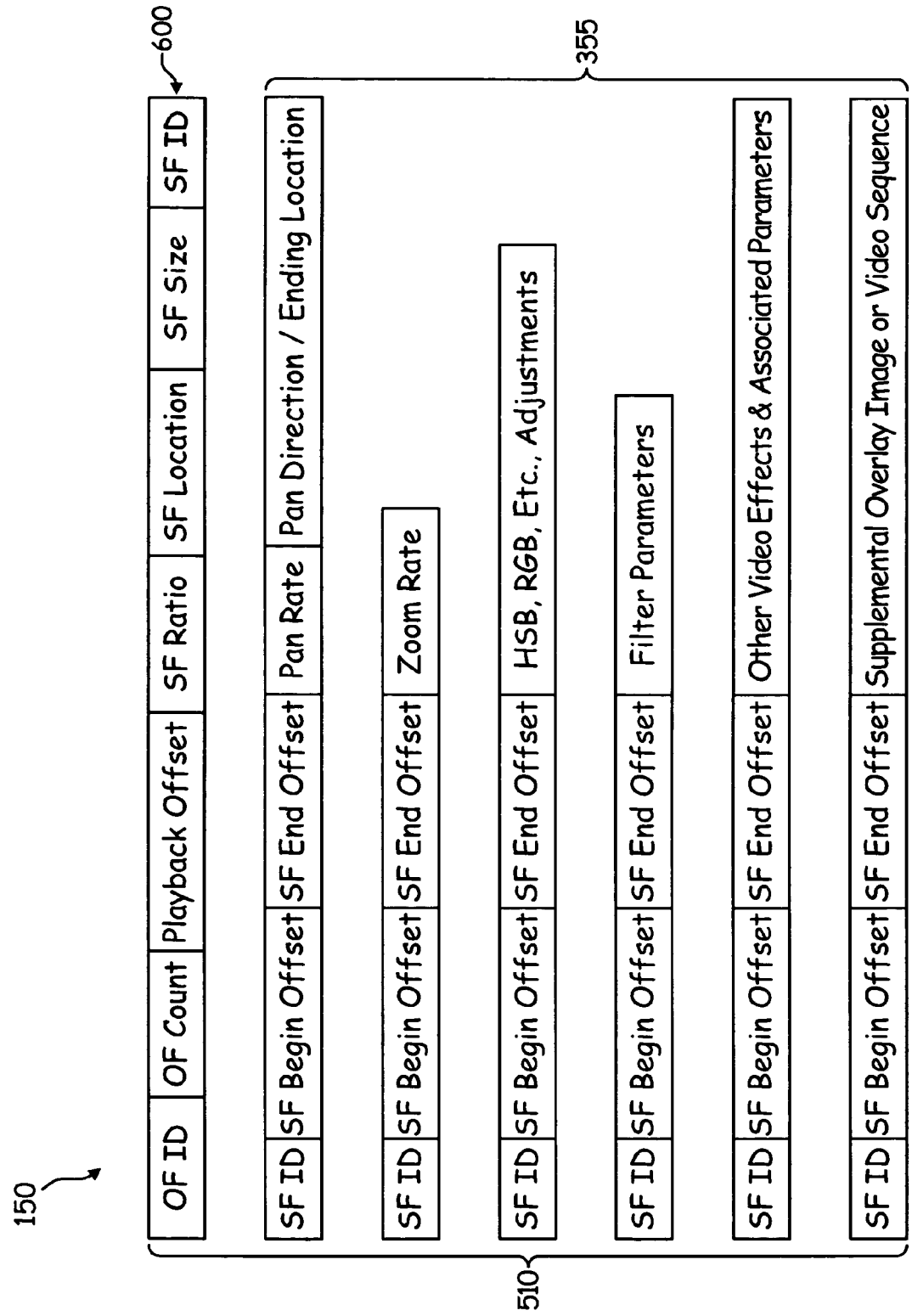
FIG. 9 is a chart illustrating exemplary sub-frame metadata including editing information for a sub-frame.

FIG. 9 is a chart illustrating exemplary sub-frame metadata including editing information for a sub-frame. Thus, FIG. 9 includes various sub-frame metadata 150 that may be found in an entry 510 of the metadata text file discussed above in connection with FIG. 8. The sub-frame metadata 150 for each sub-frame includes general sub-frame information 600, such as the sub-frame identifier (SF ID) assigned to that sub-frame, information associated with the original video frame (OF ID, OF Count, Playback Offset) from which the sub-frame is taken, the sub-frame location and size (SF Location, SF Size) and the aspect ratio (SF Ratio) of the display on which the sub-frame is to be displayed. In addition, as shown in FIG. 9, the sub-frame information 150 for a particular sub-frame may include editing information 355 for use in editing the sub-frame. Examples of editing information 355 shown in FIG. 9 include a pan direction and pan rate, a zoom rate, a color adjustment, a filter parameter, a supplemental over image or video sequence and other video effects and associated parameters.

Figure 10:
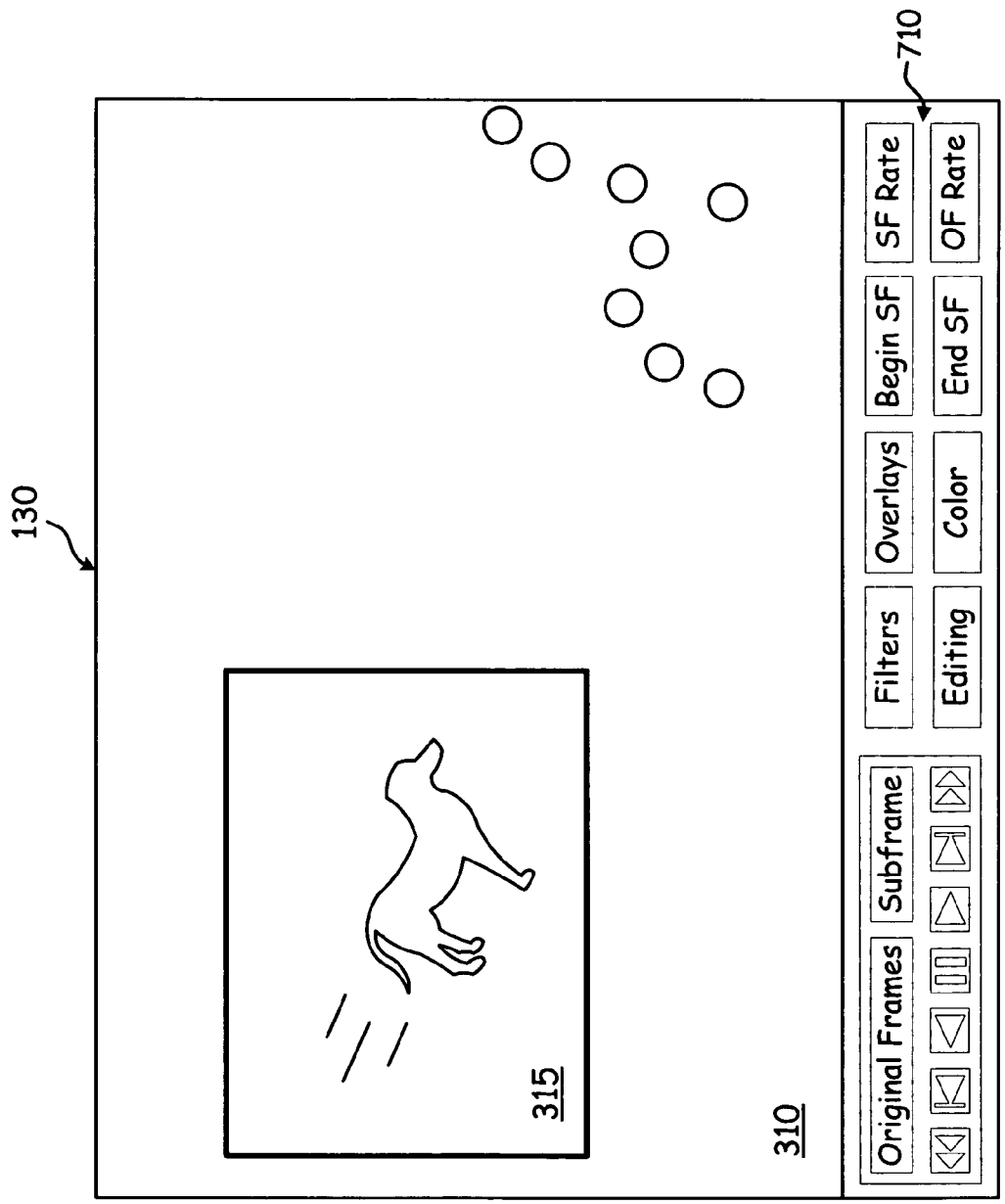
FIG. 10 is a diagram illustrating an embodiment of a video processing system display providing a graphical user interface that contains video editing tools for creating sub-frames.

FIG. 10 is a diagram illustrating an embodiment of a video processing system display providing a graphical user interface that contains video editing tools for creating sub-frames. On the video processing display 130 is displayed a current frame 310 and a sub-frame 315 of the current frame 310. The sub-frame 315 includes video data within a region of interest identified by a user, as described above in connection with FIG. 6. Once the sub-frame 315 has been identified, the user may edit the sub-frame 315 using one or more video editing tools provided to the user via the GUI 710. For example, as shown in FIG. 10, the user may apply filters, color correction, overlays, or other editing tools to the sub-frame 315 by clicking on or otherwise selecting one of the editing tools within the GUI 710. In addition, the GUI 710 may further enable the user to move between original frames and/or sub-frames to view and compare the sequence of original sub-frames to the sequence of sub-frames.

Figure 11:
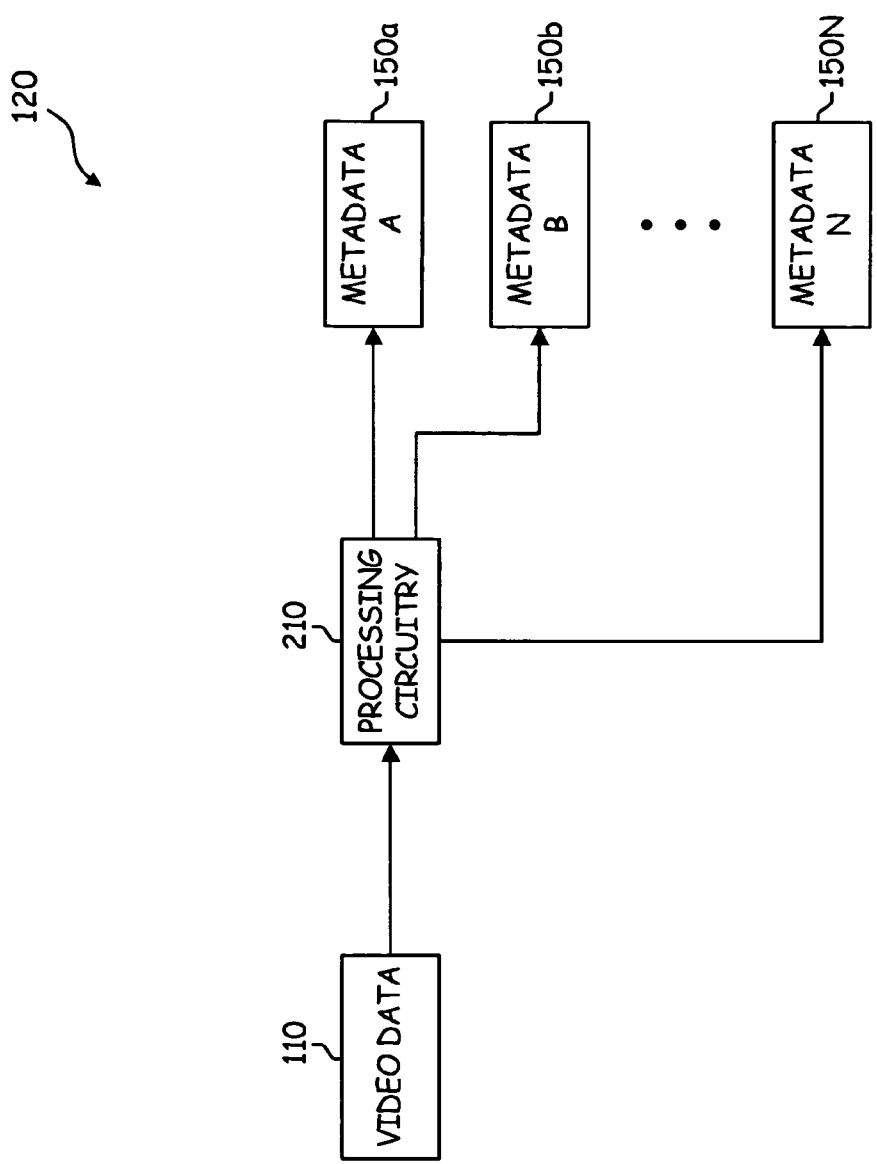
FIG. 11 is a schematic block diagram illustrating an embodiment of a video processing system for generating multiple sets of sub-frame metadata according to the present invention.

FIG. 11 is a schematic block diagram illustrating an embodiment of a video processing system for generating multiple sets of sub-frame metadata according to the present invention. Depending on the number and type of target video displays for which the video processing system 120 is generating sub-frame metadata, the processing circuitry 210 of the video processing system 120 may produce one or more sets of sub-frame metadata 150a, 150b . . . 150N from the original video data, in which each set of sub-frame metadata 150a, 150b . . . 150N is specifically generated for a particular target video display. For example, in one embodiment, for display on a first target video display, the processing circuitry 210 generates a first set of sub-frame metadata 150a that defines a sequence of sub-frames. The first set of sub-frame metadata 150a is used to modify the original video data to produce a full screen presentation of the sequence of sub-frames on the first target video display.

Figure 12:
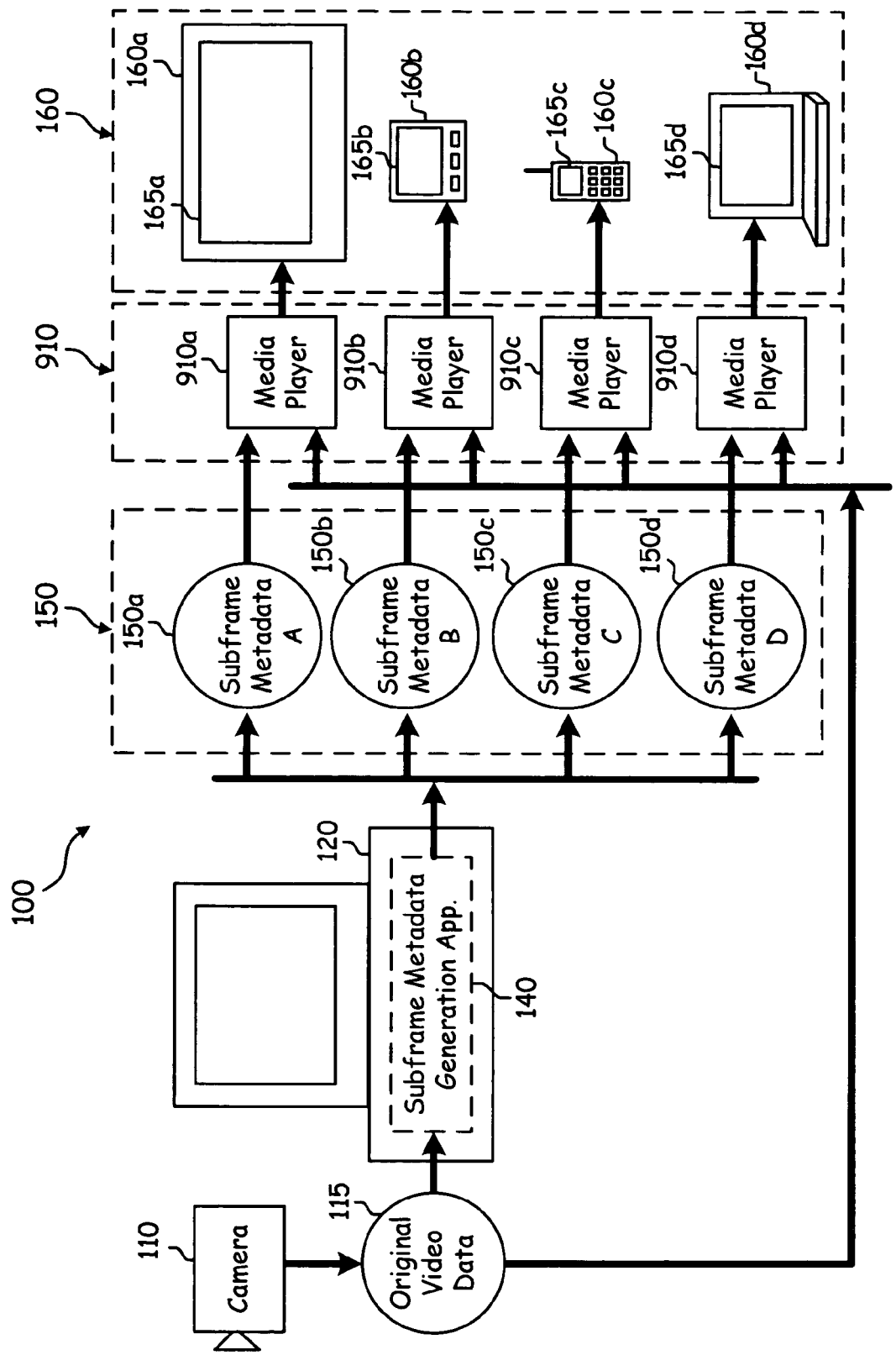
FIG. 12 is a schematic block diagram illustrating another embodiment of video processing system for generating multiple sets of sub-frame metadata for multiple target video displays according to an embodiment of the present invention.

FIG. 12 is a schematic block diagram illustrating another embodiment of video processing system for generating multiple sets of sub-frame metadata for multiple target video displays according to an embodiment of the present invention. As in FIG. 1, the video processing system 120, such as a computer or other device capable of processing video data 115 implements the sub-frame metadata generation application 140. The sub-frame metadata generation application 140 takes as input the original video data captured by camera 110 and generates sub-frame metadata 150 that defines a sequence of sub-frames for use in modifying a sequence of original video frames (video data 115) in order to produce a full screen presentation of the sub-frames on a target video display 165 of a video display device 160.

Shown in FIG. 12 are the following exemplary video display devices: television 160a, personal digital assistant (PDA) 160b, cellular telephone 160c and laptop computer 160d. Each video display device 160a-160d is communicatively coupled to a respective video display 165a-165d. In addition, each video display device 160a-160d is communicatively coupled to a respective media player 910a-910d. Each media player 910a-910d contains video player circuitry operable to process and display video content on the respective video display 165a-165d. The media player 910 may be included within the video display device 160 or may be communicatively coupled to the video display device 160. For example, media player 910a associated with television 160a may be a VCR, DVD player or other similar device.

The sub-frame metadata 150 generated by the sub-frame metadata generation application 140 may include one or more sets of sub-frame metadata 150a-150d, each specifically generated for a particular target video display 165a-165d, respectively. For example, as shown in FIG. 12, the sub-frame metadata generation application 140 generates four sets of sub-frame metadata 150a-150d, one for each target video display 165a-165d. Thus, for display on a particular video display (e.g., display 165a), the original video data is modified by the set of sub-frame metadata 150a specifically generated for that video display 165a.

In an exemplary operation, each media player 910 is communicatively coupled to receive the original video data 115 containing the sequence of original video frames and a corresponding set of sub-frame metadata 150 defining the sequence of sub-frames. The original video data and set of sub-frame metadata 150 may be received via download through the Internet or another network, broadcasting or uploading from a storage device (e.g., a VHS tape, DVD or other storage medium) communicatively coupled to the media player 910. The media player 910 uses the sub-frame metadata 150 to modify the sequence of original video frames to produce a full screen presentation on the target video display 165 corresponding to the sequence of sub-frames. For example, media player 910a is communicatively coupled to receive the original video data and sub-frame metadata 150a, media player 910b is communicatively coupled to receive the original video data and sub-frame metadata 150b, media player 910c is communicatively coupled to receive the original video data and sub-frame metadata 150c and media player 910d is communicatively coupled to receive the original video data and sub-frame metadata 150d.

Figure 13:
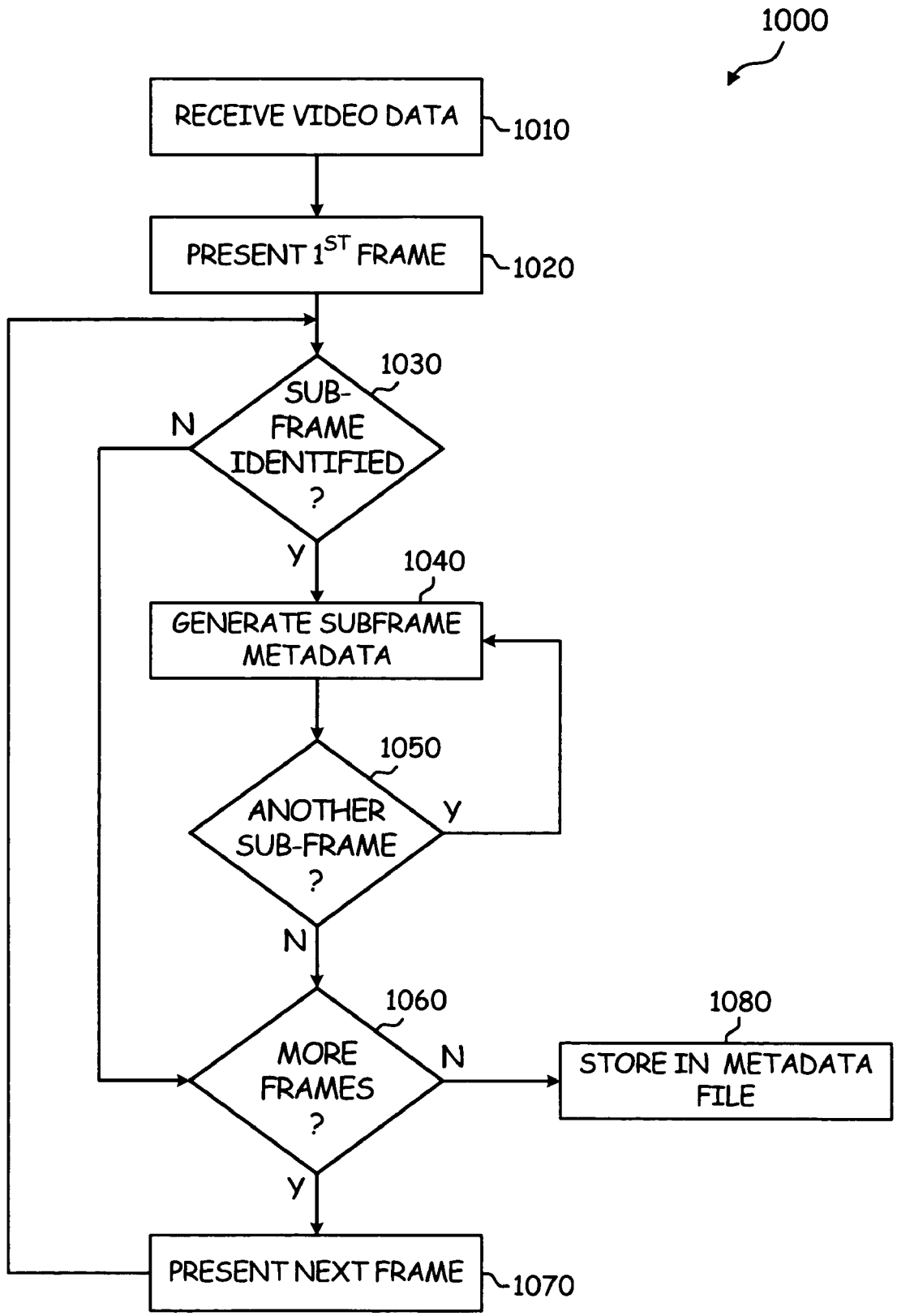
FIG. 13 is a logic diagram illustrating a process for generating sub-frame metadata in accordance with the present invention.

FIG. 13 is a logic diagram illustrating a process for generating sub-frame metadata in accordance with the present invention. The process begins at step 1010, where original video data containing video content is received from any video source (e.g., video camera, video disc, or video tape). The original video data includes a sequence of original video frames containing video content in any format. In addition, the received video data may be encoded and compressed using any coding standard, uncompressed and encoded or uncompressed and not encoded. If the original video data is compressed/encoded, the video data is decompressed and decoded to produce the sequence of original video frames.

The process continues at step 1020, where a first frame in the sequence of original video frames is presented to a user. For example, the first frame can be displayed on a display viewable by a user. The process then continues at decision step 1030, where a determination is made whether a sub-frame of the first frame has been identified. For example, the user can provide user input identifying a sub-frame corresponding to a region of interest within the first frame. If a sub-frame is identified (Y branch of 1030), the process continues to step 1040, where sub-frame metadata for the identified sub-frame is generated. For example, the sub-frame metadata for a particular sub-frame may include an identifier of the sub-frame, an identifier of the original video frame (e.g., first video frame) from which the sub-frame is taken, the location and size of the sub-frame with respect to the original video frame and any editing information for use in editing the sub-frame. This process is repeated at step 1050 for each sub-frame identified in the first frame. Thus, if another sub-frame is identified in the first frame (Y branch of 1050), the process reverts back to step 1040, where sub-frame metadata for the additional sub-frame is generated.

If a sub-frame is not identified in the first frame (N branch of 1030) or there are no more sub-frames identified in the first frame (N branch of 1050), the process continues to decision step 1060, where a determination is made whether there are more frames in the sequence of original video frames. If there are more original video frames (Y branch of 1060), the process continues to step 1070, where the next frame in the sequence of original video frames is presented to the user, and the process is then repeated at step 1030. However, if there are no more original video frames (N branch of 1060), the process continues to step 1080, where the sub-frame metadata generated for each identified sub-frame is stored in a metadata file.

Figure 14:
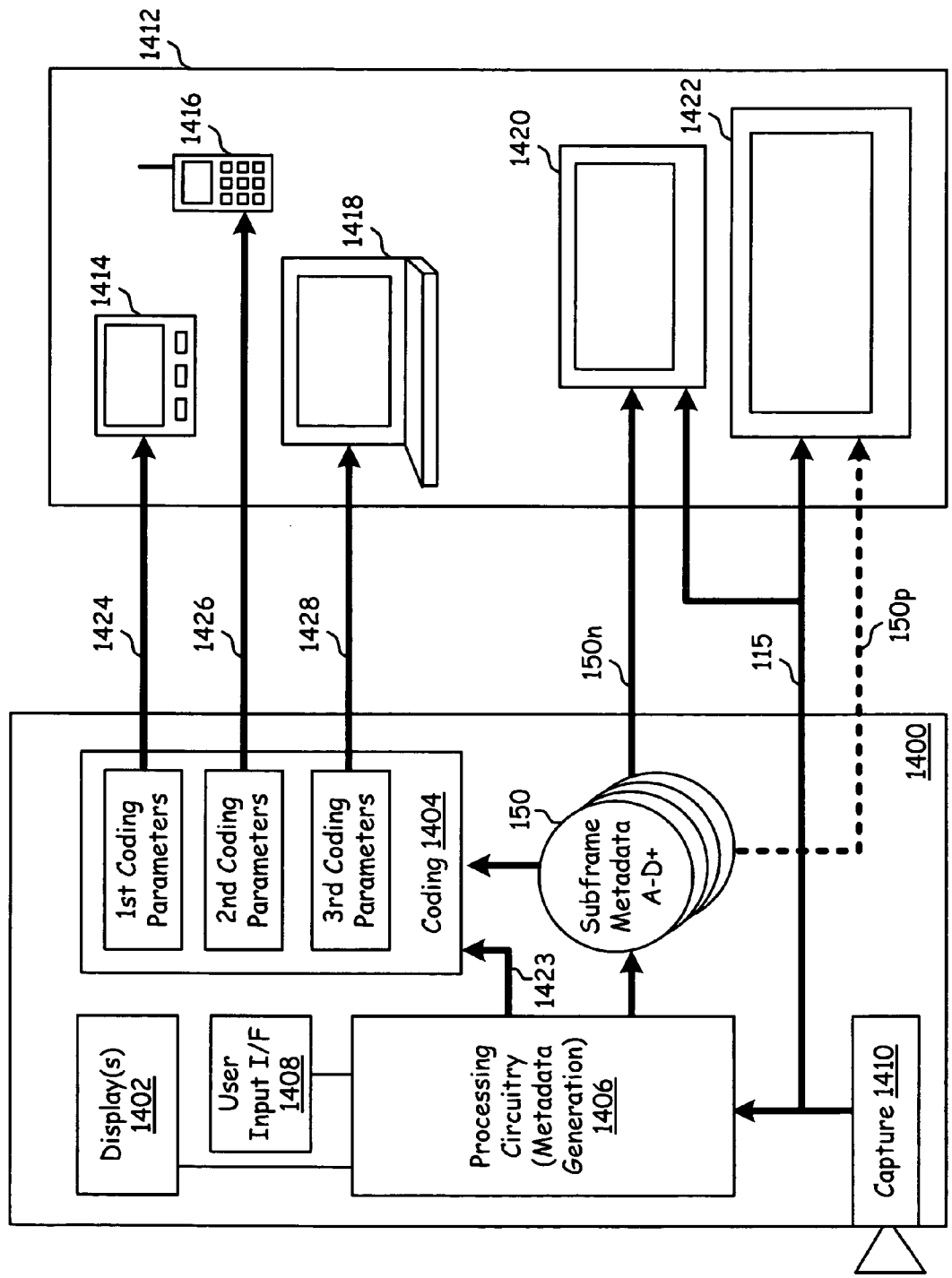
FIG. 14 is a schematic block diagram illustrating yet another embodiment of a video processing system according to the present invention.

FIG. 14 is a schematic block diagram illustrating yet another embodiment of a video processing system according to the present invention. The video camera 1400 of FIG. 14 is used with a first target video device 1422 and a second target video device 1420. The first target video device 1422 has a first video display, while the second target video device has a second video display. The first video display of the first target video device 1422 has a substantially larger screen resolution than that of the second video display of the second target video device 1420. The first video display of the first target video device 1422 may also have a larger viewing area than that of the second target video device 1420.

The video camera 1400 includes a camera video display 1402, a user input interface 1408, video capture circuitry 1410, processing circuitry 1406, and, optionally, coding circuitry 1404. The camera video display 1402 may be a single video display, such as was illustrated in FIG. 2 and described therewith, or may include multiple video displays. The user input interface 1408 receives user input as was described with reference to FIG. 1 for use with a sub-frame metadata generation application implemented therewith. The user input interface 1408 may include a keyboard, a mouse, or anther user interface device(s) that is/are operable to receive user input. The capture circuitry 1410 captures a sequence of original video frames. The capture circuitry 1410 includes camera-type circuitry as was previously described with reference to FIGS. 1 through 5.

The processing circuitry 1406 couples to the camera video display 1402, the capture circuitry 1410, and the user input interface 1408. The processing circuitry 1406 may be any type of digital processing circuitry that executes software and/or firmware instructions and operates upon data. The processing circuitry 1406 delivers at least one frame of the sequence of original video frames captured by the capture circuitry 1410 to the camera video display 1402. The manner in which the at least one frame of the sequence of original video frames is displayed on the camera video display 1402 was previously described with reference to FIG. 2 and FIG. 3.

The processing circuitry 1406 responds to the user input interface 1408 to present a sub-frame on the camera video display 1402. The manner in which sub-frames are displayed on the camera video display 1402 is the same or similar to the manner that was previously described with reference to FIGS. 2 and/or 3. The sub-frame corresponds to a region in the at least one frame of the sequence of original video frames. The manner in which the original video frame(s) and the sub-frame(s) are displayed on the camera video display is the same or similar to the manner previously described with reference to FIG. 2 and illustrated thereon.

The processing circuitry 1406 generates metadata 150 corresponding to the sub-frame. The metadata 150 is to be used in modifying the sequence of original video frames to produce a full screen presentation on the second display of the second target video device 1420. Such full screen presentation on the second display of the second target video device 1420 corresponds to the sub-frame presented on the camera video display 1402 by the processing circuitry 1406.

As is shown, the camera 1400 produces the sequence of original video frames 115 to both the first target video device 1422 and the second target video device 1420. Further, the camera 1400 produces metadata 150n to the second target video device 1420 and optionally produces metadata 150p to the first target video device 1422. In a first operation of the camera 1400, the first target video device 1422 produces a full screen presentation on the first video display corresponding to the sequence of original video frames 115. Further, with this operation, the second target video device 1420 uses the metadata 150n to modify the sequence of original video frames 115 to produce a full screen presentation on its second video display.

In another operation similar to those previously described, the metadata 150p is used by the first target video device 1422 in modifying the sequence of original video frames 115 to produce a further full screen presentation on the first video display of the first target video device 1422. This further full screen presentation displayed on the first video display of the first target video device 1422 may correspond to another sub-frame presented on the camera video display 1402 in response to the user input interface 1408. The operations of the present invention in generating metadata based upon various sub-frames produced in response to user input was previously described with reference to FIGS. 2 through 13.

According to another operation of the camera 1400, coding circuitry 1404 produces encoded outputs 1424, 1426, and 1428 to target video devices 1414, 1416, and 1418, respectively. In producing these outputs 1424, 1426, and 1428, the processing circuitry 1406 produces outputs 1423 to the coding circuitry 1404. These outputs may include video that is produced to correspond to all of the target video devices 1414, 1416, and 1418 as a group, or individually tailored to each of the target video devices 1424, 1426, and/or 148. The coding circuitry 1404 codes the outputs 1423 received from the processing circuitry 1406 to generate the outputs 1424, 1426, and 1428. These outputs 1424, 1426, and 1428 will be used to produce full screen presentations on the additional target video displays of the additional target video devices 1414, 1416, and 1418. In particular, the coding circuitry 1404 produces first encoded output 1424 based upon first coding parameters corresponding to target video device 1414. Further, the coding circuitry produces encoded video outputs 1426 and 1428 based upon second and third coding parameters corresponding to target video devices 1416 and 1418.

Thus, according to the embodiment of FIG. 14, the video camera 1400 produces as its output the sequence of original video frames 115, metadata 150, and video outputs 1424, 1426, and 1428. The output of the video camera 1400 may be produced at the time of capture of the sequence of original video frames 1410. Alternatively, the video camera 1400 may capture and store the sequence of original video frames and later produce its outputs to video devices and/or to storage devices.

Figure 15:
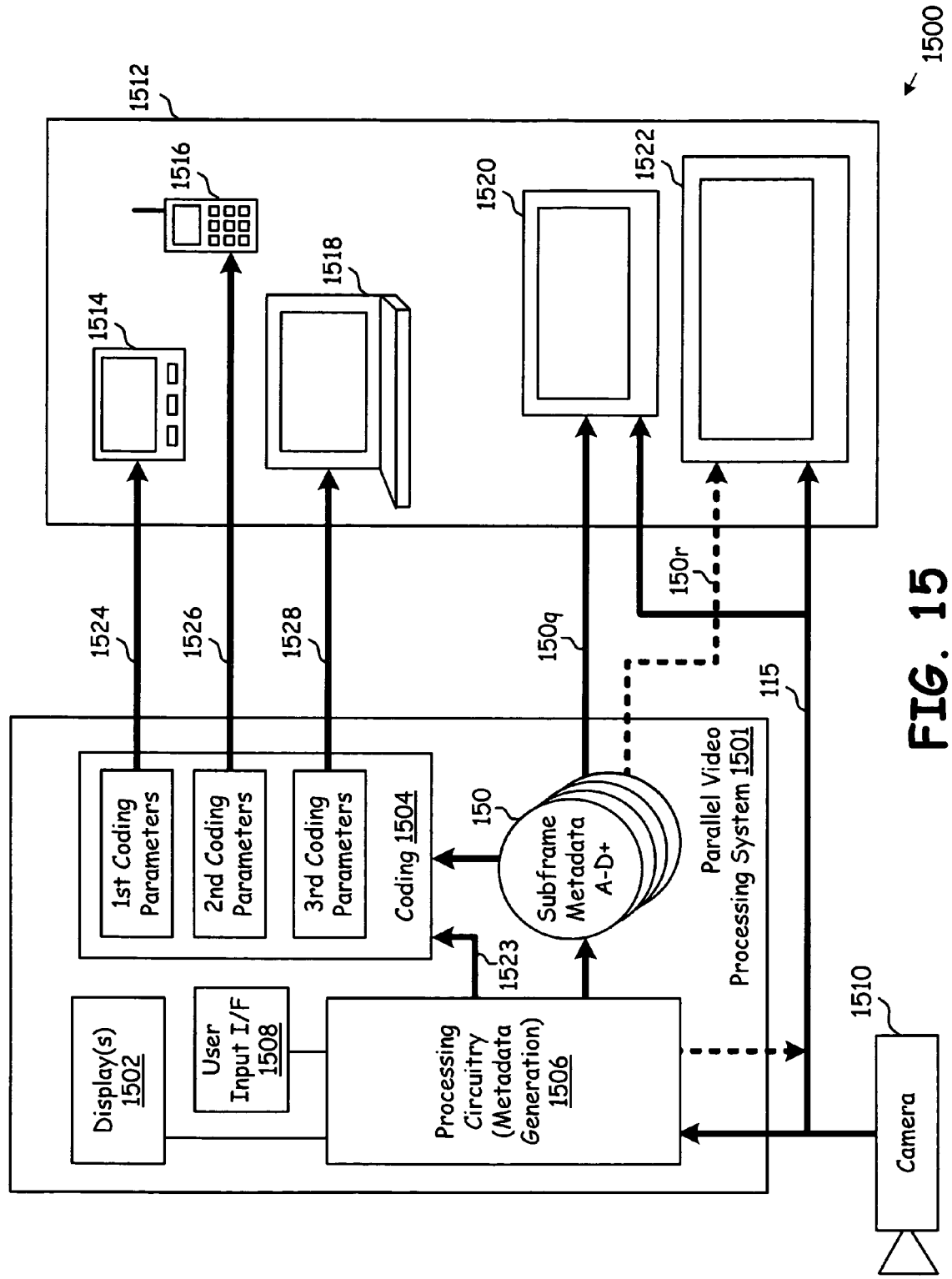
FIG. 15 is a schematic block diagram illustrating still another embodiment of a video processing system according to the present invention.

FIG. 15 is a schematic block diagram illustrating still another embodiment of a video processing system according to the present invention. A video camera system 1500 of FIG. 15 includes a camera 1510 and a parallel video processing system 1501. The camera 1510 captures a sequence of original video frames 115. The video camera 1510, also referred to as video capture circuitry, produces the sequence of original video frames 115 to both the parallel video processing system 1501 and to a first target video device 1522.

The parallel video processing system 1501 includes one or more video displays 1502, a user input interface 1508, processing circuitry 1506, and may include coding circuitry 1504. Some components of the parallel video processing system 1501 of FIG. 15 have common functionality with commonly named components of the video camera 1400 of FIG. 14 and those components will not be described further with reference to FIG. 15. The video display 1502 has a full screen area, which may correspond to the video display 130 illustrated in FIG. 2 and described therewith. The processing circuitry 1506 of the parallel video processing system 1501 may be dedicated hardware, general purpose hardware, and/or software capable of performing the operations of the parallel video processing system 1501 or any portion thereof. The processing circuitry 1506 responds to the user input interface 1508 to present a sub-frame on the video display 1502. The sub-frame displayed on the video display 1502 corresponds to a region within the full screen area of the video display 1502. Referring briefly to FIG. 2, the sub-frame may correspond to sub-frames 131, 133, or 135, each of which is viewable within the full screen area 130 of the video display 1502.

Referring again to FIG. 15, the video capture circuitry (camera) 1510 captures a sequence of original video frames 115. The processing circuitry 1506 delivers at least one frame of the sequence of original video frames for presentation using the full screen area of video display 1502. The processing circuitry 1506 further generates a first output to be used to produce a first presentation on a first display of the first target video device 1522 that corresponds to the full screen area. Further, the processing circuitry 1506 generates a second output to be used to produce a second presentation on a second display of the second target video device 1520 with the second output corresponding to one or more sub-frames. As is shown in FIG. 15, the processing circuitry 1506 may generate the first output 115 that corresponds to the sequence of original video frames. Alternatively, the output produced to the first target video device 1522 may include both the sequence of original video frames 115 and metadata 150r. The processing circuitry 1506 further generates a second output used to produce a second presentation on the second target video device 1520 that corresponds to the sub-frame. The output produced to the second target video device 1520 may include metadata 150q and also the sequence of original video frames 115. The first target video device 1522 and the second target video device 1520 use the inputs provided to them that include the sequence of original video frames 115 and the metadata 150q and 150r to produce respective presentations.

According to another operation of the video camera system of FIG. 15, the processing circuitry 1506 operates in conjunction with the coding circuitry 1504 to produce coded video outputs 1524, 1526, and 1528, to target video devices 1514, 1516, and 1518. The encoded video outputs 1524, 1526, and 1528, are based upon first, second and third coding parameters respective to the target video devices 1514, 1516, and 1518. Video data 1523 may be provided to the coding circuitry 1504 by the processing circuitry 1506.

Thus, as contrasted to prior systems, the video camera system of FIG. 15 produces directly encoded video that is tailored to particular target video devices. Further, the video camera system of FIG. 15 produces not only the encoded video, but the metadata 150, and the sequence of original video frames 115. Moreover, as was described previously with reference to FIGS. 1 through 14, the processing circuitry 1506 may produce other additional outputs that are respected to additional sub-frames displayed on the video display 152 in response to user input interface 1508. Thus, for each particular sub-frame, the video camera system 1500 of FIG. 15 may produce outputs that are tailored for particular target video displays. Further, the video camera system 1500 may simply produce sub-frame metadata that includes information respective to many target devices. The target devices would then extract relevant portions of the metadata 150 for use in generating video data based upon the sequence of original video frames.

According to another aspect of the video camera system of FIG. 15, the video camera system includes a camera housing that contains the video display 1502, the user input interface 1508, the processing circuitry 1506, and the video capture circuitry 1510. This housing may further enclose the coding circuitry 1504. According to another aspect of the video camera system 1500 of FIG. 15, the video camera system 1500 includes a camera housing and a support system housing. The camera housing contains the video capture circuitry 1510, while the support system housing contains at least a portion of the processing circuitry 1506. The support system housing may also contain the displays 1502, the user input interface 1508, and coding circuitry 1504.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A video camera system used with a first target video device and a second target video device, the video camera system comprising:
a video display that has a full screen area;
a user input interface;
video capture circuitry to capture a sequence of original video frames, each of the original video frames in the sequence representing an original size area of detail;
processing circuitry to respond to the user input interface to present a plurality of sub-frames of an original video frame of the sequence of original video frames on the video display, the plurality of sub-frames including regions of the original video frame representing second areas of detail smaller than the original size area of detail;
the processing circuitry to deliver at least one frame of the sequence of original video frames for presentation using the full screen area of the video display;
the processing circuitry to generate a first output to be used to produce a first presentation on the first target video device, the first presentation including the original video frame;
the processing circuitry to generate a second output, different from the first output, to be used to produce a second presentation on the second target video device, the second presentation including the plurality of sub-frames of the original video frame; and the second output further including metadata indicating an order in which the plurality of sub-frames is to be displayed to produce the second presentation.

2. The video camera system of claim 1, the second output comprises video output.

3. The video camera system of claim 2, wherein the video output comprises encoded video output.

4. The video camera system of claim 1, wherein the processing circuitry generates a third output corresponding to an additional sub-frame presented on the video display.

5. The video camera system of claim 1, further comprising a camera housing accommodating the video display, the user input interface, the processing circuitry, and the video capture circuitry.

6. A method comprising:
capturing a sequence of original video frames with a video camera, the original video frames representing original size areas of detail;
presenting at least one frame of the sequence of original video frames on a video display;
receiving user input regarding the sequence of original video frames;
presenting a sub-frame on the video display that corresponds to a region in at least one frame of the sequence of original video frames that is identified in the user input, wherein the sub-frame includes a second area of detail smaller than the original size areas of detail; and
generating metadata corresponding to the sub-frame, the metadata indicating to a target video player how to modify the sequence of original video frames to produce a full screen presentation on a target video display of the target video player corresponding to the sub-frame, wherein the video display has a larger viewing area than that of the target video display.

7. The method of claim 6, further comprising producing the sub-frame corresponding to the region in the at least one frame of the sequence of original video frames to a secondary video display.

8. The method of claim 6, wherein the metadata includes an association of the sub-frame with a plurality of frames of the sequence of original video frames.

9. The method of claim 6, further comprising:
responding to additional signals representing user input by presenting an additional sub-frame on the video display associated with the sequence of original video frames; and
generating additional metadata corresponding to the additional sub-frame, the additional metadata to be used by an additional target video player in modifying the sequence of original video frames to produce a full screen presentation on the additional target video display, the metadata and additional metadata generated by the processing circuitry together define a set of sub-frames.

10. The method of claim 9, wherein at least two sub-frames of the set of sub-frames correspond to a single frame of the sequence of original video frames.

11. The method of claim 9, wherein at least two sub-frames of the set of sub-frames include an object whose spatial position varies over the sequence of original video frames.

12. The method of claim 9, wherein two sub-frames of the set of sub-frames correspond to at least two different frames of the sequence of original video frames.

13. The method of claim 9, wherein at least a portion of the set of sub-frames corresponds to a sub-scene of a scene depicted across the sequence of original video frames.

14. The method of claim 6, wherein the metadata further includes editing information for use by the target video player circuitry in editing the sub-frame presented.

15. The method of claim 14, wherein the editing information comprises a visual modification to be applied to the portions of the sequence of original video frames associated with the sub-frame.

16. The method of claim 14, wherein the editing information comprises motion information to be applied to the sub-frame.

17. The method of claim 14, wherein the editing information comprises resizing information to be applied to the sub-frame.

18. The method of claim 14, wherein the editing information comprises media to be applied to the sub-frame.

19. The method of claim 6, further comprising:
receiving audio information corresponding to the sequence of original video frames; and
generating the metadata to include information for use by the target video player circuitry in modifying the audio information for presentation by the target video player corresponding to the sub-frame.

* * * * *

UNITED STATES PATENT AND TRADEMARK OFFICE
CERTIFICATE OF CORRECTION

| | | |
|---|---|---|
| PATENT NO. | : 7,893,999 B2 | Page 1 of 1 |
| APPLICATION NO. | : 11/491019 | |
| DATED | : February 22, 2011 | |
| INVENTOR(S) | : James D. Bennett | |

It is certified that error appears in the above-identified patent and that said Letters Patent is hereby corrected as shown below:

Col. 21, line 4, in claim 2: after "claim 1," insert --wherein--

Signed and Sealed this
Seventh Day of August, 2012

David J. Kappos
*Director of the United States Patent and Trademark Office*